United States Patent
Chen et al.

(10) Patent No.: US 12,028,914 B2
(45) Date of Patent: Jul. 2, 2024

(54) DATA TRANSFER METHOD AND ELECTRONIC DEVICE

(71) Applicant: Huawei Technologies Co., Ltd., Shenzhen (CN)

(72) Inventors: Chen Chen, Wuhan (CN); Dapeng Zhang, Wuhan (CN); Leilei Zheng, Wuhan (CN); Chuntao Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 563 days.

(21) Appl. No.: 17/281,177

(22) PCT Filed: Oct. 15, 2018

(86) PCT No.: PCT/CN2018/110304
§ 371 (c)(1),
(2) Date: Mar. 29, 2021

(87) PCT Pub. No.: WO2020/062344
PCT Pub. Date: Apr. 2, 2020

(65) Prior Publication Data
US 2021/0400744 A1    Dec. 23, 2021

(30) Foreign Application Priority Data
Sep. 30, 2018    (WO) ................ PCT/CN2018/109220

(51) Int. Cl.
*H04W 76/14*    (2018.01)
*H04W 4/80*    (2018.01)
(Continued)

(52) U.S. Cl.
CPC ............. *H04W 76/14* (2018.02); *H04W 4/80* (2018.02); *H04W 8/28* (2013.01); *H04W 84/12* (2013.01)

(58) Field of Classification Search
CPC ......... H04W 76/14; H04W 4/80; H04W 8/28; H04W 84/12; H04L 2101/622; H04L 2101/681
See application file for complete search history.

(56) References Cited

U.S. PATENT DOCUMENTS 10,148,587 B2 * 12/2018 Choi ...................... G06Q 50/01
2013/0239031 A1    9/2013 Ubillos et al.
(Continued)

FOREIGN PATENT DOCUMENTS

CN    102315864 A    1/2012
CN    103384369 A    11/2013
(Continued)

OTHER PUBLICATIONS

L. Lei, J. Qi and K. Zheng, "Patent Analytics Based on Feature Vector Space Model: A Case of IoT," in IEEE Access, vol. 7, Apr. 3, 2019, doi: 10.1109/ACCESS.2019.2909123, 11 pages.
(Continued)

*Primary Examiner* — John D Blanton
(74) *Attorney, Agent, or Firm* — Conley Rose, P.C.

(57) ABSTRACT

A data transfer method includes that a first device displays a first interface. The first interface includes image information of a first file. When a distance between a Near-Field Communication (NFC) chip of the first device and an electronic tag of a second device is less than a preset threshold, the first device obtains a BLUETOOTH address of the second device. The electronic tag includes device information of the second device, and the device information includes the BLUETOOTH address or a tag identifier (ID) used to obtain the BLUETOOTH address. The first device exchanges a WI-FI connection parameter with the second device through a BLUETOOTH connection corresponding to the BLUETOOTH address. The first device establishes a WI-FI connection to the second device. After
(Continued)

the WI-FI connection is established, the first device automatically transfers the first file to the second device through the WI-FI connection.

20 Claims, 26 Drawing Sheets

(51) Int. Cl.
    *H04W 8/28*     (2009.01)
    *H04W 84/12*     (2009.01)

(56) References Cited

U.S. PATENT DOCUMENTS

| | | | |
|---|---|---|---|
| 2014/0342670 A1* | 11/2014 | Kang | H04L 69/14 |
| | | | 455/67.11 |
| 2017/0064063 A1 | 3/2017 | Watanabe | |
| 2017/0235980 A1 | 8/2017 | Wang et al. | |
| 2018/0260186 A1* | 9/2018 | Zhu | H04L 67/1095 |
| 2020/0097083 A1* | 3/2020 | Mao | G06F 3/16 |
| 2020/0145793 A1* | 5/2020 | Coulbourne | H01L 33/54 |

FOREIGN PATENT DOCUMENTS

| | | |
|---|---|---|
| CN | 203504630 U | 3/2014 |
| CN | 103781068 A | 5/2014 |
| CN | 105101055 A | 11/2015 |
| CN | 105191172 A | 12/2015 |
| CN | 204813820 U | 12/2015 |
| CN | 105554062 A | 5/2016 |
| CN | 107704785 A | 2/2018 |
| EP | 2632187 A1 | 8/2013 |
| EP | 2838309 A1 | 2/2015 |
| JP | 2017046231 A | 3/2017 |
| KR | 20150050099 A | 5/2015 |

OTHER PUBLICATIONS

Li Ying, Research and Implementation of Self-adaptation Wireless Transmission on Wearable Device, May 30, 2015, 60 pages.

* cited by examiner

DATA TRANSFER METHOD AND ELECTRONIC DEVICE

CROSS-REFERENCE TO RELATED APPLICATIONS

This application is a U.S. National Stage of International Patent Application No. PCT/CN2018/110304 filed on Oct. 15, 2018, which claims priority to International Patent Application No. PCT/CN2018/109220 filed on Sep. 30, 2018, both of which are incorporated herein by reference in their entities.

TECHNICAL FIELD

Embodiments of this application relate to the field of communications technologies, and in particular, to a data transfer method and an electronic device.

BACKGROUND

With development of communications technologies, there are an increasing quantity of short-range file transfer manners. For example, a file may be transferred between devices through Bluetooth, a wireless fidelity (wireless fidelity, Wi-Fi) direct connection (that is, a Wi-Fi direct connection), or near field communication (near field communication, NFC).

An NFC contact-based transfer manner is widely used because of convenience. Both devices (for example, a device 1 and a device 2) between which a file is transferred through NFC contact are provided with NFC chips. A process of transferring a file through NFC contact may include: The device 1 selects a to-be-shared file (for example, a picture) in response to an operation of a user. The device 1 enables an NFC contact function (for example, enables Android Beam) in response to an operation of the user. The NFC chip of the device 1 contacts the NFC chip of the device 2, to implement Bluetooth pairing and connection between the device 1 and the device 2. In response to an operation of the user, the device 1 transfers the to-be-shared file to the device 2 through the Bluetooth connection between the device 1 and the device 2.

When a file is transferred through NFC contact, both devices need to be provided with NFC chips. However, not all devices are provided with an NFC chip. For example, many personal computers (personal computer, PC) are not provided with an NFC chip. In addition, to transfer a file through NFC contact, costs of configuring NFC chips for devices are relatively high.

SUMMARY

Embodiments of this application provide a data transfer method and an electronic device, so that a file can be transferred through NFC contact without increasing hardware costs, user operations can be simplified, and a file transfer rate can be increased.

According to a first aspect, an embodiment of this application provides a data transfer method. The method is used by a first device to transfer a file to a second device. The first device is provided with an NFC chip, and the second device is provided with an electronic tag. The electronic tag includes device information of the second device. The data transfer method provided in this embodiment of this application may include: The first device displays a first interface. The first interface includes image information of a first file. When a distance between the NFC chip of the first device and the electronic tag of the second device is less than a preset threshold, the first device may obtain the device information of the second device, and then establish a communication connection to the second device based on the device information of the second device. After the first device establishes the communication connection to the second device, the first device automatically sends the first file corresponding to the currently displayed first interface to the second device through the communication connection. It should be noted that, before the first device approaches the second device (that is, before the distance between the NFC chip and the electronic tag is less than the preset threshold), the first device may have established a communication connection to the second device. In this case, after obtaining the device information of the second device, the first device may not need to establish a communication connection to the second device again, but may directly send the first file corresponding to the currently displayed interface to the second device. Alternatively, before the distance between the first device and the second device is less than the preset threshold, the first device may have established a first communication connection to the second device. In this case, after obtaining the device information of the second device, the first device may quickly establish a second communication connection through the established first communication connection, and then send the first file corresponding to the currently displayed interface to the second device through the second communication connection. In this way, a speed of establishing the second communication connection can be increased, thereby increasing a file transfer speed.

With reference to the first aspect, in a possible design manner, the device information may include, for example, a Bluetooth address or a tag ID used to obtain a Bluetooth address. The method in this embodiment may specifically include: The first device displays a first interface. The first interface includes image information of a first file. When the distance between the NFC chip of the first device and the electronic tag of the second device is less than the preset threshold, the first device obtains the Bluetooth address of the second device. The first device exchanges a Wi-Fi connection parameter with the second device through a Bluetooth connection corresponding to the Bluetooth address. The first device establishes a first Wi-Fi connection to the second device. After the first Wi-Fi connection is established, the first device automatically transfers the first file to the second device through the first Wi-Fi connection. In the solution of this embodiment of this application, when the first device displays the first interface, after the first device approaches the second device, the first device can automatically send the first file corresponding to the first interface to the second device, thereby simplifying user operations. Before the distance between the NFC chip of the first device and the electronic tag of the second device is less than the preset threshold, the first device may have established a Bluetooth connection to the second device. In this case, after obtaining the Bluetooth address of the second device through the electronic tag, the first device may directly transfer the Wi-Fi parameter through the established Bluetooth connection, to establish the Wi-Fi connection.

The second device 220 does not need to be provided with an NFC chip, and costs of configuring the electronic tag are relatively low. Therefore, in this embodiment of this application, a file can be transferred through NFC contact without increasing hardware costs. In addition, as long as the NFC chip 211 approaches the electronic tag 221, a user can transfer, to the second device 220, the first file corresponding to the first interface currently displayed by the first device, thereby simplifying user operations. Further, exchanging the Wi-Fi connection parameter through the Bluetooth connection can increase a speed of establishing the first Wi-Fi connection, and improve file transfer efficiency. In addition, transferring the first file through the first Wi-Fi connection can increase a file transfer rate.

In this embodiment of this application, in some cases, the user may not need to select a to-be-shared file, because the to-be-shared file in this embodiment of this application is the first file included in the first interface currently displayed by the first device. In addition, the user does not need to manually enable an NFC contact function, because in this embodiment of this application, when the NFC chip approaches the electronic tag of the second device, the NFC chip may obtain the Bluetooth address of the second device, automatically establish the Bluetooth connection based on the Bluetooth address, and establish the Wi-Fi connection. The user does not need to tap a share button, because the first device may automatically transfer the first file to the second device through the Wi-Fi connection after the Wi-Fi connection is established. In conclusion, according to the method in this embodiment of this application, user operations in a process of transferring a file through NFC contact can be simplified, and user experience of transferring a file through NFC contact can be improved.

With reference to the first aspect, in a possible design manner, the first interface further includes image information of a second file. In this case, before the first device automatically transfers the first file to the second device through the first Wi-Fi connection, the user may select the first file from the first interface. Specifically, before the first device automatically transfers the first file to the second device through the first Wi-Fi connection, the method in this embodiment of this application may further include: The first device displays a second interface. The second interface includes information items that are in a one-to-one correspondence with the first file and the second file. The first device receives a selection operation performed by the user on a first information item. The first information item is an information item corresponding to the first file.

In this embodiment of this application, when the first interface is an interface corresponding to a plurality of files, before sending a file to the second device, the first device may display the second interface from which the user selects a to-be-sent file. In this way, the first device may send a file to the second device based on selection of the user in the second interface and an intention of the user, thereby improving user experience during data transfer between the first device and the second device. In this embodiment, the user only needs to select a to-be-shared file, and does not need to manually enable an NFC contact function or tap a share button, thereby greatly simplifying user operations.

With reference to the first aspect, in another possible design manner, the first interface further includes image information of a second file. In other words, the first interface may include image information of a plurality of files (for example, the first file and the second file). In this case, the first device may automatically transfer all of the plurality of files to the second device through the first Wi-Fi connection. For example, the first device may not only transfer the first file to the second device through the first Wi-Fi connection, but also automatically transfer the second file to the second device through the first Wi-Fi connection. In other words, the first device may automatically transfer all the files included in the first interface to the second device.

With reference to the first aspect, in another possible design manner, the device information includes the Bluetooth address. In other words, the electronic tag of the second device includes the Bluetooth address of the second device. In this case, the first device may directly obtain the Bluetooth address of the second device from the electronic tag. Specifically, the electronic tag stores the Bluetooth address of the second device. Therefore, when the distance between the NFC chip and the electronic tag is less than the preset threshold, the NFC chip may send an electromagnetic wave, and in response to the electromagnetic wave, the electronic tag may send data stored in the electronic tag to the NFC chip, for example, the Bluetooth address of the second device and the tag ID.

With reference to the first aspect, in another possible design manner, the device information includes the tag ID. In other words, the electronic tag does not include the Bluetooth address of the second device. In this case, the user may configure a correspondence between the tag ID of the electronic tag and the Bluetooth address of the second device in a use process, so that the tag ID can be used to identify the second device. A method for obtaining the Bluetooth address by the first device may include: The first device may obtain the tag ID from the electronic tag, and search for the Bluetooth address corresponding to the tag ID. If the first device does not find the Bluetooth address corresponding to the tag ID, the first device searches for a surrounding Bluetooth device, and displays a third interface. The third interface includes at least one Bluetooth option, and each Bluetooth option corresponds to one Bluetooth device found by the first device. The first device receives a selection operation performed by the user on a first Bluetooth option in the at least one Bluetooth option. The first Bluetooth option corresponds to the second device. In response to the selection operation performed by the user on the first Bluetooth option, the first device obtains the Bluetooth address of the second device that corresponds to the first Bluetooth option.

With reference to the first aspect, in another possible design manner, in response to the selection operation performed by the user on the first Bluetooth option, the first device may store the correspondence between the tag ID and the Bluetooth address of the second device. In this way, when the NFC chip approaches the electronic tag again, the first device may find the Bluetooth address corresponding to the tag ID.

With reference to the first aspect, in another possible design manner, the first device stores the tag ID and the Bluetooth address corresponding to the tag ID. In this case, the first device may find the Bluetooth address corresponding to the tag ID. The first device may exchange the Wi-Fi connection parameter with the second device through the Bluetooth connection corresponding to the found Bluetooth address, and the first device establishes the first Wi-Fi connection to the second device. After the first Wi-Fi connection is established, the first device automatically transfers the first file to the second device through the first Wi-Fi connection.

With reference to the first aspect, in another possible design manner, in response to the selection operation performed by the user on the first Bluetooth option, the first device may transfer the Bluetooth address of the second device to the electronic tag through the NFC chip. After receiving the Bluetooth address of the second device, the electronic tag may store the Bluetooth address of the second device. In this way, when an NFC chip of another device (for example, the NFC chip of the first device) approaches the electronic tag, the NFC chip may directly obtain the Bluetooth address of the second device from the electronic chip.

With reference to the first aspect, in another possible design manner, the first interface includes one or more pictures, and the first file is at least one picture in the first interface; or the first interface is a home screen of the first device, and the first file is a screenshot of the home screen; or the first interface is a video playing interface, and the first interface is a video file that is being played by the first device or address information of a video file that is being played by the first device; or the first interface is a browser page of the first device, and the first file is a page address or a screenshot of the browser page; or the first interface is a document opened by the first device, for example, a page or a directory of the document, and the first file is a document currently opened by the first device.

With reference to the first aspect, in another possible design manner, the method further includes: After the first file is transferred, the first device disconnects the first Wi-Fi connection to the second device, and maintains the Bluetooth connection to the second device. Further, the first device may exchange a wireless fidelity Wi-Fi connection parameter with the second device again through the maintained Bluetooth connection, and the first device establishes a second Wi-Fi connection to the second device. After the second Wi-Fi connection is established, the first device transfers a third file to the second device through the second Wi-Fi connection. In other words, after the first file is transferred, the Wi-Fi connection between the two devices may be disconnected, but the Bluetooth connection between the two devices is maintained. When the first device performs NFC contact with the second device again, the first device may exchange a Wi-Fi parameter with the second device through the maintained Bluetooth connection, and further establish a new Wi-Fi connection for data transfer. After the file is transferred, the Wi-Fi connection is disconnected to reduce power consumption, and the Bluetooth connection is maintained to quickly establish a Wi-Fi connection during next transfer, thereby increasing a transfer speed. In addition, power consumption for maintaining the Bluetooth connection is relatively low.

With reference to the first aspect, in another possible design manner, the Bluetooth connection corresponding to the Bluetooth address is a Bluetooth persistent connection that is automatically maintained after a Bluetooth connection is established between the first device and the second device for the first time. Before the first file is transferred, the first device may have transferred another file to the second device through NFC contact. In this case, the Bluetooth connection is maintained. Alternatively, before the first file is transferred, the first device has established the Bluetooth connection to the second device in another manner (for example, a Bluetooth connection maintained after the user actively triggers the Bluetooth connection). In this case, the first device may establish the Wi-Fi connection through the maintained Bluetooth connection.

According to a second aspect, an embodiment of this application provides a data transfer method. The method is used by a first device to transfer a file to a second device. The first device is provided with an NFC chip, and the second device is provided with an electronic tag. The electronic tag includes device information of the second device, and the device information includes a Bluetooth address or a tag ID used to obtain a Bluetooth address. The data transfer method provided in this embodiment of this application may include: The first device displays a first interface. The first interface includes image information of a first file. When a distance between the NFC chip of the first device and the electronic tag of the second device is less than a preset threshold, the first device obtains the Bluetooth address of the second device. After a Bluetooth connection corresponding to the Bluetooth address is established, the first device automatically transfers the first file to the second device through the Bluetooth connection. It should be noted that, before the distance between the NFC chip of the first device and the electronic tag of the second device is less than the preset threshold, the first device may have established a Bluetooth connection to the second device. In this case, after obtaining the Bluetooth address of the second device through the electronic tag, the first device may directly transfer a file through the established Bluetooth connection. Because the Bluetooth connection between the two devices may be established in advance, a time of subsequently establishing the connection is saved, thereby increasing a file transfer speed.

According to the data transfer method provided in this embodiment of this application, the second device does not need to be provided with an NFC chip, and costs of configuring the electronic tag are relatively low. Therefore, in this embodiment of this application, a file can be transferred through NFC contact without increasing hardware costs. In addition, as long as the NFC chip approaches the electronic tag, a user can transfer, to the second device, the first file corresponding to the first interface currently displayed by the first device, thereby simplifying user operations.

In this embodiment of this application, in some cases, the user may not need to select a to-be-shared file, because the to-be-shared file in this embodiment of this application is the first file included in the first interface currently displayed by the first device. In addition, the user does not need to manually enable an NFC contact function, because in this embodiment of this application, when the NFC chip approaches the electronic tag of the second device, the NFC chip may obtain the Bluetooth address of the second device, and automatically establish the Bluetooth connection based on the Bluetooth address. The user does not need to tap a share button, because the first device may automatically transfer the first file to the second device through the Bluetooth connection after the Bluetooth connection is established. In conclusion, according to the method in this embodiment of this application, user operations in a process of transferring a file through NFC contact can be simplified, and user experience of transferring a file through NFC contact can be improved.

With reference to the second aspect, in a possible design manner, the first interface further includes image information of a second file. In this case, before the first device automatically transfers the first file to the second device through the Bluetooth connection, the user may select the first file from the first interface. Specifically, before the first device transfers the first file to the second device, the method in this embodiment of this application may further include: The first device displays a second interface. The second interface includes information items that are in a one-to-one correspondence with the first file and the second file. The first device receives a selection operation performed by the user on a first information item. The first information item is an information item corresponding to the first file.

In this embodiment of this application, when the first interface is an interface corresponding to a plurality of files, before sending a file to the second device, the first device may display the second interface from which the user selects a to-be-sent file. In this way, the first device may send a file to the second device based on selection of the user in the second interface and an intention of the user, thereby improving user experience during data transfer between the first device and the second device.

With reference to the second aspect, in another possible design manner, the first interface further includes image information of a second file. In other words, the first interface may include image information of a plurality of files (for example, the first file and the second file). In this case, the first device may automatically transfer all of the plurality of files to the second device through the Bluetooth connection. For example, the first device may not only transfer the first file to the second device through the Bluetooth connection, but also automatically transfer the second file to the second device through the Bluetooth connection.

With reference to the second aspect, in another possible design manner, the device information includes the Bluetooth address. In other words, the electronic tag of the second device includes the Bluetooth address of the second device. In this case, the first device may directly obtain the Bluetooth address of the second device from the electronic tag. Specifically, the electronic tag stores the Bluetooth address of the second device. Therefore, when the distance between the NFC chip and the electronic tag is less than the preset threshold, the NFC chip may send an electromagnetic wave, and in response to the electromagnetic wave, the electronic tag may send data stored in the electronic tag to the NFC chip, for example, the Bluetooth address of the second device and the tag ID.

With reference to the second aspect, in another possible design manner, the device information includes the tag ID. In other words, the electronic tag does not include the Bluetooth address of the second device. In this case, the user may configure a correspondence between the tag ID of the electronic tag and the Bluetooth address of the second device in a use process, so that the tag ID can be used to identify the second device. A method for obtaining the Bluetooth address by the first device may include: The first device may obtain the tag ID from the electronic tag, and search for the Bluetooth address corresponding to the tag ID. If the first device does not find the Bluetooth address corresponding to the tag ID, the first device searches for a surrounding Bluetooth device, and displays a third interface. The third interface includes at least one Bluetooth option, and each Bluetooth option corresponds to one Bluetooth device found by the first device. The first device receives a selection operation performed by the user on a first Bluetooth option in the at least one Bluetooth option. The first Bluetooth option corresponds to the second device. In response to the selection operation performed by the user on the first Bluetooth option, the first device obtains the Bluetooth address of the second device that corresponds to the first Bluetooth option.

With reference to the second aspect, in another possible design manner, in response to the selection operation performed by the user on the first Bluetooth option, the first device may store the correspondence between the tag ID and the Bluetooth address of the second device. In this way, when the NFC chip approaches the electronic tag again, the first device may find the Bluetooth address corresponding to the tag ID.

With reference to the second aspect, in another possible design manner, the first device stores the tag ID and the Bluetooth address corresponding to the tag ID. In this case, the first device may find the Bluetooth address corresponding to the tag ID. After the Bluetooth connection corresponding to the found Bluetooth address is established, the first device may automatically transfer the first file to the second device through the Bluetooth connection.

With reference to the second aspect, in another possible design manner, in response to the selection operation performed by the user on the first Bluetooth option, the first device may transfer the Bluetooth address of the second device to the electronic tag through the NFC chip. After receiving the Bluetooth address of the second device, the electronic tag may store the Bluetooth address of the second device. In this way, when an NFC chip of another device (for example, the NFC chip of the first device) approaches the electronic tag, the NFC chip may directly obtain the Bluetooth address of the second device from the electronic chip.

For detailed descriptions of the first interface and the first file in the second aspect and the possible design manners of the second aspect, refer to the descriptions in the possible design manners of the first aspect in the embodiments of this application. Details are not described in this embodiment of this application again.

With reference to the second aspect, in another possible design manner, the method further includes: After the first file is transferred, the first device maintains the Bluetooth connection to the second device. Further, the first device may transfer a third file to the second device through the maintained Bluetooth connection. In other words, after the first file is transferred, the Bluetooth connection between the two devices may continue to be maintained, in other words, the Bluetooth connection is not disconnected. When the first device performs NFC contact with the second device again, the first device may directly transfer data to the second device through the maintained Bluetooth connection, thereby increasing a transfer speed. In addition, power consumption for maintaining the Bluetooth connection is relatively low.

With reference to the second aspect, in another possible design manner, the Bluetooth connection corresponding to the Bluetooth address is a Bluetooth persistent connection that is automatically maintained after a Bluetooth connection is established between the first device and the second device for the first time.

According to a third aspect, an embodiment of this application provides an electronic device. The electronic device is a first device, the electronic device includes one or more processors, a memory, a display, an NFC chip, and a communications module, the memory, the display, the communications module, and the NFC chip are coupled to the processor, and the memory is configured to store information.

Specifically, the display is configured to display a first interface. The first interface includes image information of a first file. The processor is configured to: when a distance between the NFC chip and an electronic tag of a second device is less than a preset threshold, obtain device information of the second device that is included in the electronic tag. The communications module is configured to establish a communication connection to the second device based on the device information of the second device. The processor is further configured to: after the communication connection is established, automatically send the first file corresponding to the currently displayed first interface to the second device through the communication connection.

With reference to the third aspect, in a possible design manner, the communications module may include a Bluetooth module and a Wi-Fi module. Specifically, the display is configured to display the first interface. The first interface includes the image information of the first file. The processor is configured to: when the distance between the NFC chip and the electronic tag of the second device is less than the preset threshold, obtain a Bluetooth address of the second device through the NFC chip. The electronic tag includes the device information of the second device, and the device information includes the Bluetooth address or a tag ID used to obtain the Bluetooth address. The processor is further configured to exchange a wireless fidelity Wi-Fi connection parameter with the second device based on a Bluetooth connection corresponding to the Bluetooth address. The Wi-Fi module is further configured to establish a Wi-Fi connection to the second device based on the Wi-Fi connection parameter. The processor is further configured to: after the Wi-Fi module establishes the first Wi-Fi connection, automatically transfer the first file to the second device through the first Wi-Fi connection.

With reference to the third aspect, in a possible design manner, the first interface displayed by the display further includes image information of a second file. The display is further configured to: before the first file is automatically transferred to the second device through the first Wi-Fi connection, display a second interface. The second interface includes information items that are in a one-to-one correspondence with the first file and the second file. The processor is further configured to receive a selection operation performed by a user on a first information item displayed by the display. The first information item is an information item corresponding to the first file.

With reference to the third aspect, in another possible design manner, the first interface displayed by the display further includes image information of a second file. The processor is further configured to automatically transfer the second file to the second device through the first Wi-Fi connection.

With reference to the third aspect, in another possible design manner, the device information includes the Bluetooth address. That the processor is configured to obtain a Bluetooth address of the second device through the NFC tag includes: The processor is configured to obtain the Bluetooth address of the second device from the electronic tag through the NFC tag.

With reference to the third aspect, in another possible design manner, the device information includes the tag ID. The processor is configured to: obtain the tag ID from the electronic tag through the NFC tag, search for the Bluetooth address corresponding to the tag ID, and if the Bluetooth address corresponding to the tag ID is not found, search for a surrounding Bluetooth device through the Bluetooth module. The display is configured to display a third interface. The third interface includes at least one Bluetooth option, and each Bluetooth option corresponds to one Bluetooth device found by the Bluetooth module. The processor is further configured to: receive a selection operation performed by the user on a first Bluetooth option in the at least one Bluetooth option, where the first Bluetooth option corresponds to the second device; and in response to the selection operation performed by the user on the first Bluetooth option, obtain the Bluetooth address of the second device that corresponds to the first Bluetooth option.

With reference to the third aspect, in another possible design manner, the memory is further configured to: in response to the selection operation performed by the user on the first Bluetooth option, store a correspondence between the tag ID and the Bluetooth address of the second device.

With reference to the third aspect, in another possible design manner, the memory stores the tag ID and the Bluetooth address corresponding to the tag ID. The processor is further configured to: if the processor finds the Bluetooth address corresponding to the tag ID, exchange the Wi-Fi connection parameter with the second device through the Bluetooth connection corresponding to the Bluetooth address. The Wi-Fi module is further configured to establish the first Wi-Fi connection to the second device based on the Wi-Fi connection parameter. The processor is further configured to: after the Wi-Fi module establishes the first Wi-Fi connection, automatically transfer the first file to the second device through the first Wi-Fi connection.

With reference to the third aspect, in another possible design manner, the processor is further configured to: in response to the selection operation performed by the user on the first Bluetooth option, transfer the Bluetooth address of the second device to the electronic tag through the NFC chip.

With reference to the third aspect, in another possible design manner, the first interface displayed by the display includes one or more pictures, and the first file is at least one picture in the first interface; or the first interface displayed by the display is a home screen of the first device, and the first file is a screenshot of the home screen; or the first interface displayed by the display is a video playing interface, and the first interface is a video file that is being played by the first device or address information of a video file that is being played by the first device; or the first interface displayed by the display is a browser page of the first device, and the first file is a page address or a screenshot of the browser page; or the first interface displayed by the display is a document opened by the first device, and the first file is a document currently opened by the first device.

With reference to the third aspect, in another possible design manner, the processor is further configured to: after the first file is transferred, disconnect the first Wi-Fi connection to the second device, and maintain the Bluetooth connection to the second device. Further, the processor is further configured to: exchange a wireless fidelity Wi-Fi connection parameter with the second device again through the maintained Bluetooth connection, and establish a second Wi-Fi connection to the second device; and after the second Wi-Fi connection is established, transfer a third file to the second device through the second Wi-Fi connection.

With reference to the third aspect, in another possible design manner, the Bluetooth connection corresponding to the Bluetooth address is a Bluetooth persistent connection that is automatically maintained after a Bluetooth connection is established between the first device and the second device for the first time.

According to a fourth aspect, an embodiment of this application provides an electronic device. The electronic device is a first device, the electronic device includes one or more processors, a memory, a display, a near field communication NFC chip, and a Bluetooth module, the memory, the display, the Bluetooth module, and the NFC chip are coupled to the processor, and the memory is configured to store information.

Specifically, the display is configured to display a first interface. The first interface includes image information of a first file. The processor is configured to: when a distance between the NFC chip and an electronic tag of a second device is less than a preset threshold, obtain a Bluetooth address of the second device through the NFC chip. The electronic tag includes device information of the second device, and the device information includes the Bluetooth address or a tag ID used to obtain the Bluetooth address. The Bluetooth module is configured to establish a Bluetooth connection corresponding to the Bluetooth address. The processor is further configured to: after the Bluetooth module establishes the Bluetooth connection, automatically transfer the first file to the second device through the Bluetooth connection.

With reference to the fourth aspect, in a possible design manner, the first interface displayed by the display further includes image information of a second file. The display is further configured to: before the processor transfers the first file to the second device through the Bluetooth connection, display a second interface. The second interface includes information items that are in a one-to-one correspondence with the first file and the second file. The processor is further configured to receive a selection operation performed by a user on a first information item displayed by the display. The first information item is an information item corresponding to the first file.

With reference to the fourth aspect, in another possible design manner, the first interface displayed by the display further includes image information of a second file. The processor is further configured to automatically transfer the second file to the second device through the Bluetooth connection.

With reference to the fourth aspect, in another possible design manner, the device information includes the Bluetooth address. That the processor is configured to obtain a Bluetooth address of the second device through the NFC chip includes: The processor is configured to obtain the Bluetooth address of the second device from the electronic tag through the NFC chip.

With reference to the fourth aspect, in another possible design manner, the device information includes the tag ID. The processor is configured to: obtain the tag ID from the electronic tag through the NFC chip, and search for the Bluetooth address corresponding to the tag ID; and if the Bluetooth address corresponding to the tag ID is not found, search for a surrounding Bluetooth device through the Bluetooth module. The display is further configured to display a third interface. The third interface includes at least one Bluetooth option, and each Bluetooth option corresponds to one Bluetooth device found by the Bluetooth module. The processor is further configured to receive a selection operation performed by the user on a first Bluetooth option in the at least one Bluetooth option. The first Bluetooth option corresponds to the second device. The processor is further configured to: in response to the selection operation performed by the user on the first Bluetooth option, obtain the Bluetooth address of the second device that corresponds to the first Bluetooth option.

With reference to the fourth aspect, in another possible design manner, the memory is further configured to: in response to the selection operation performed by the user on the first Bluetooth option, store a correspondence between the tag ID and the Bluetooth address of the second device.

With reference to the fourth aspect, in another possible design manner, the memory stores the tag ID and the Bluetooth address corresponding to the tag ID. The processor is further configured to: if the processor finds the Bluetooth address corresponding to the tag ID, after the Bluetooth connection corresponding to the Bluetooth address is established, automatically transfer the first file to the second device through the Bluetooth connection.

With reference to the fourth aspect, in another possible design manner, the processor is further configured to: in response to the selection operation performed by the user on the first Bluetooth option, transfer the Bluetooth address of the second device to the electronic tag through the NFC chip.

With reference to the fourth aspect, in another possible design manner, the first interface displayed by the display includes one or more pictures, and the first file is at least one picture in the first interface; or the first interface displayed by the display is a home screen of the first device, and the first file is a screenshot of the home screen; or the first interface displayed by the display is a video playing interface, and the first interface is a video file that is being played by the first device or address information of a video file that is being played by the first device; or the first interface displayed by the display is a browser page of the first device, and the first file is a page address or a screenshot of the browser page; or the first interface displayed by the display is a document opened by the first device, and the first file is a document currently opened by the first device.

With reference to the fourth aspect, in another possible design manner, the processor is further configured to: after the first file is transferred, maintain the Bluetooth connection to the second device. Further, the processor is further configured to transfer a third file to the second device through the maintained Bluetooth connection.

With reference to the fourth aspect, in another possible design manner, the Bluetooth connection corresponding to the Bluetooth address is a Bluetooth persistent connection that is automatically maintained after a Bluetooth connection is established between the first device and the second device for the first time.

According to a fifth aspect, an embodiment of this application provides a computer storage medium, including a computer instruction. When the computer instruction is run on an electronic device, the electronic device is enabled to perform the data transfer method in the first aspect and the possible design manners of the first aspect or the second aspect and the possible design manners of the second aspect.

According to a sixth aspect, an embodiment of this application provides a computer program product. When the computer program product is run on a computer, the computer is enabled to perform the data transfer method in the first aspect and the possible design manners of the first aspect or the second aspect and the possible design manners of the second aspect.

It may be understood that the electronic device in the third aspect and the possible design manners of the third aspect or the fourth aspect and the possible design manners of the fourth aspect, the computer storage medium in the fifth aspect, and the computer program product in the sixth aspect are all configured to perform corresponding methods provided above. Therefore, for beneficial effects that the electronic device, the computer storage medium, and the computer program product can achieve, refer to beneficial effects in the corresponding methods provided above. Details are not described herein again.

BRIEF DESCRIPTION OF DRAWINGS

FIG. 3A-1 and FIG. 3A-2 are a flowchart 1 of a data transfer method according to an embodiment of this application;

FIG. 3C-1 and FIG. 3C-2 are a schematic diagram 1 of an instance of a display interface of an electronic device according to an embodiment of this application;

FIG. 4A-1, FIG. 4A-2, and FIG. 4A-3 are a schematic diagram 2 of an instance of a display interface of an electronic device according to an embodiment of this application;

FIG. 4C-1 and FIG. 4C-2 are a flowchart 2 of a data transfer method according to an embodiment of this application;

FIG. 6A-1 and FIG. 6A-2 are a flowchart 3 of a data transfer method according to an embodiment of this application;

FIG. 6B-1 and FIG. 6B-2 are a flowchart 4 of a data transfer method according to an embodiment of this application;

DESCRIPTION OF EMBODIMENTS

Figure 1:
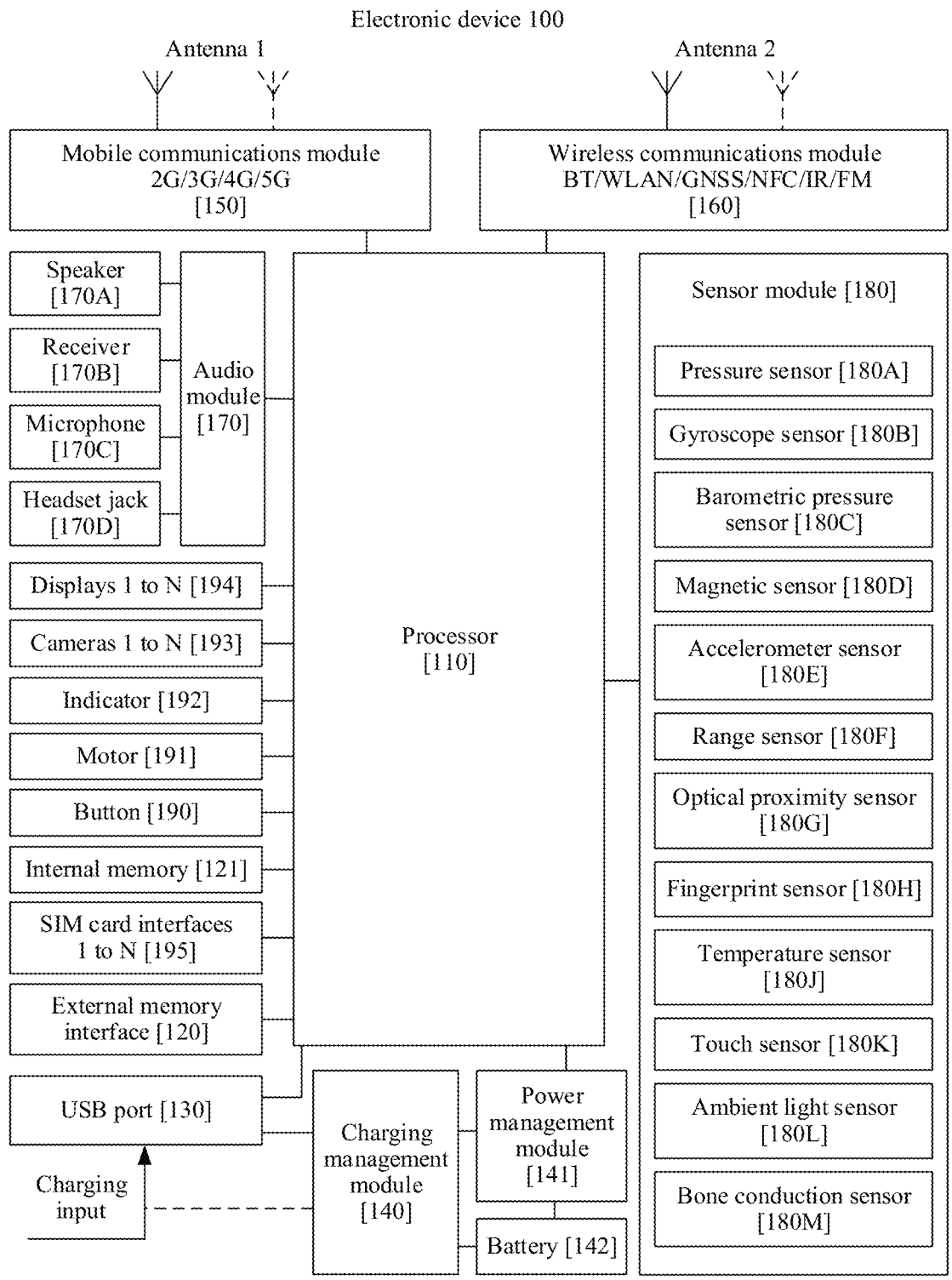
FIG. 1 is a schematic diagram of a hardware structure of an electronic device according to an embodiment of this application.

The embodiments of this application provide a data transfer method. The method may be used by a first device (for example, a mobile phone) to transfer a file to a second device (for example, a PC). The first device is provided with an NFC chip, and the second device may be provided with an electronic tag. The electronic tag may include a Bluetooth address of the second device, or the electronic tag includes a tag ID used to obtain a Bluetooth address. When the first device displays a first interface, if the NFC chip of the first device approaches the electronic tag of the second device, the first device may obtain the Bluetooth address of the second device. The first device may establish a Bluetooth connection to the second device corresponding to the Bluetooth address, then exchange a Wi-Fi connection parameter with the second device through the Bluetooth connection, establish a Wi-Fi connection, and transfer a first file included in the first interface to the second device through the Wi-Fi connection. In the embodiments of this application, that the NFC chip approaches the electronic tag specifically means that a distance between the NFC chip and the electronic tag is less than a preset threshold (that is, a first threshold). For example, the preset threshold may be 10 centimeters (cm) or 20 cm.

It should be noted that, before the NFC chip of the first device approaches the electronic tag of the second device, the first device may have established a Bluetooth connection to the second device. In this case, after obtaining the Bluetooth address of the second device through the electronic tag, the first device may directly transfer the Wi-Fi parameter through the established Bluetooth connection, to establish the Wi-Fi connection. After establishing a Bluetooth connection for the first time, the first device and the second device may maintain a Bluetooth persistent connection in the background. When the distance between the first device and the second device is greater than a second threshold, because the two devices are relatively far from each other, the Bluetooth connection is interrupted. When the distance between the first device and the second device is less than the second threshold, the two devices automatically establish a Bluetooth connection, and maintain the Bluetooth connection. In this case, after the first file is transferred, the Wi-Fi connection between the first device and the second device may be disconnected, and the Bluetooth connection between the two devices may be maintained. In this way, a Wi-Fi connection may be directly established through the maintained Bluetooth connection during next file transfer, thereby increasing a speed of establishing the Wi-Fi connection and increasing a data transfer speed.

In another implementation, before the NFC chip of the first device approaches the electronic tag of the second device, the first device does not establish a Bluetooth connection to the second device. In this case, after obtaining the Bluetooth address of the second device through the electronic tag, the first device establishes a Bluetooth connection to the second device based on the Bluetooth address, to further establish the Wi-Fi connection. Similarly, in this case, after the first file is transferred, the Wi-Fi connection between the first device and the second device may be disconnected, and the Bluetooth connection between the two devices may be maintained. Optionally, after the first file is transferred, both the Wi-Fi connection and the Bluetooth connection between the first device and the second device may be disconnected.

In the solutions of the embodiments of this application, the second device does not need to be provided with an NFC chip, and costs of configuring the electronic tag are relatively low. Therefore, a file can be transferred through NFC contact without increasing hardware costs. In the embodiments of this application, NFC contact means that an NFC chip approaches an electronic tag. In addition, as long as the NFC chip of the first device approaches the electronic tag of the second device, a user can transfer, to the second device, the first file corresponding to the first interface currently displayed by the first device, thereby simplifying user operations. Further, exchanging the Wi-Fi connection parameter through the Bluetooth connection can increase a speed of establishing the Wi-Fi connection, and improve file transfer efficiency. In addition, transferring the first file through the Wi-Fi connection can increase a file transfer rate. In addition, because a Bluetooth persistent connection may be maintained between the first device and the second device, when the two devices perform NFC contact, because of existence of the Bluetooth persistent connection, trusted authentication and a Bluetooth connection do not need to be performed again between the devices, but a Wi-Fi connection can be directly and quickly performed between the devices. In this way, a Wi-Fi connection can be established through single contact, thereby increasing a file transfer rate.

In the embodiments of this application, the user does not need to select a to-be-shared file, because the to-be-shared file in the embodiments of this application is the first file included in the first interface currently displayed by the first device. In addition, the user does not need to manually enable an NFC contact function, because in the embodiments of this application, when the NFC chip approaches the electronic tag of the second device, the NFC chip may obtain the Bluetooth address of the second device, automatically establish the Bluetooth connection based on the Bluetooth address, and establish the Wi-Fi connection, or establish the Wi-Fi connection based on the previously established Bluetooth connection. The user does not need to tap a share button, because the first device may automatically transfer the first file to the second device through the Wi-Fi connection after the Wi-Fi connection is established. In conclusion, according to the method in the embodiments of this application, user operations in a process of transferring a file through NFC contact can be simplified, and user experience of transferring a file through NFC contact can be improved.

The electronic tag (tag) in the embodiments of this application may be an NFC tag or a radio frequency identification (radio frequency identification, RFID) tag. The electronic tag may be pasted on the second device, or may be included inside the second device.

In a first application scenario, the electronic tag of the second device is pasted on the second device before the second device is delivered from a factory. The electronic tag stores the tag ID of the electronic tag and the Bluetooth address of the second device. A tag ID of an electronic tag may uniquely identify the electronic tag. For example, the tag ID of the electronic tag 221 may be a product serial number (serial number, SN) or another device identifier of the second device 220.

In a second application scenario, the electronic tag is added to the second device after the second device is delivered from a factory. For example, the electronic tag may be pasted on the second device by a user or a vendor. The electronic tag stores the tag ID of the electronic tag. Because the electronic tag is added to the second device after delivery, the electronic tag does not include information about the second device (for example, the Bluetooth address of the second device). The tag ID of the electronic tag can only uniquely identify the electronic tag, and cannot identify the second device. In this case, the user may configure a correspondence between the tag ID of the electronic tag and the Bluetooth address of the second device in a use process, so that the tag ID can be used to identify the second device.

For ease of understanding by a person skilled in the art, an operating principle of the electronic tag is described in the embodiments of this application.

Generally, electronic tags can be classified into a passive tag, a semi-active tag, and an active tag.

(1) Passive tag: There is no internal power supply in the passive tag. When approaching an NFC chip of another device, the passive tag may receive an electromagnetic wave sent by the NFC chip. An internal integrated circuit (integrated circuit, IC) of the passive tag is driven by a received electromagnetic wave signal. When receiving an electromagnetic wave signal of sufficient strength, the passive tag may send data stored in the passive tag to the NFC chip, for example, a tag ID, or a tag ID and a Bluetooth address.

(2) Semi-active tag: A working mode of the semi-active tag is similar to that of the passive tag. A difference lies in that the semi-active tag includes a small battery. The small battery has enough power to drive an internal IC of the semi-active tag, so that the IC works. Because the semi-active tag includes the foregoing small battery, the semi-active tag responds faster than the passive tag.

(3) Active tag: The active tag includes an internal power supply, which is used to supply power to an internal IC to generate an external signal. Generally, the active tag allows NFC communication at a relatively long distance, and the active tag has relatively large storage space, which may be used to store data transferred by an NFC chip of another device.

The electronic tag in the embodiments of this application may be any one of the passive tag, the semi-active tag, and the active tag. In actual application, in consideration of advantages of the passive tag such as low price, small size, and no need of power supply, the electronic tag is usually the passive tag.

For example, the first device in the embodiments of this application may be a portable computer (for example, a mobile phone), a notebook computer, a wearable electronic device (for example, a smartwatch), a tablet computer, an augmented reality (augmented reality, AR) device/a virtual reality (virtual reality, VR) device, or a vehicle-mounted device. A specific form of the first device is not particularly limited in the following embodiments. The second device in the embodiments of this application may also be a portable computer (for example, a mobile phone), a notebook computer, a wearable electronic device (for example, a smartwatch), a tablet computer, an augmented reality (augmented reality, AR) device/a virtual reality (virtual reality, VR) device, or a vehicle-mounted device. A specific form of the second device is not particularly limited in the following embodiments. In specific implementation, the first device and the second device may be devices of a same type, or may be devices of different types.

FIG. 1 is a schematic structural diagram of an electronic device 100 according to an embodiment of this application. The electronic device 100 may be a first device or a second device. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that a structure shown in the embodiments of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (Neural-network Processing Unit, NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be configured to perform audio communication; and sample, quantize, and encode an analog signal. In some embodiments, the audio module 170 may be coupled to the wireless communications module 160 through the PCM bus interface. In some embodiments, the audio module 170 may alternatively transfer an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect to the processor 110 and the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music through a Bluetooth headset.

The MIPI interface may be configured to connect to the processor 110 and a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect to the processor 110, the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is a port that conforms to a USB standard specification, and may be specifically a mini USB port, a micro USB port, a USB Type C port, or the like. The USB port 130 may be configured to connect to the charger to charge the electronic device 100, or may be configured to transmit data between the electronic device 100 and a peripheral device, or may be configured to connect to a headset to play audio through the headset, or may be configured to connect to another electronic device such as an AR device.

It can be understood that an interface connection relationship between the modules shown in the embodiments of the present invention is merely an example for description, and does not constitute a limitation on the structure of the electronic device 100. In some other embodiments of this application, the electronic device 100 may alternatively use an interface connection manner that is different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication bands. Different antennas may be further multiplexed, to increase antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G/3G/4G/5G, and the like. The mobile communications module 150 may include at least one filter, a switch, a power amplifier, a low noise amplifier (Low Noise Amplifier, LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (wireless local area networks, WLAN) (for example, a Wi-Fi network), Bluetooth (Bluetooth, BT), a global navigational satellite system (global navigation satellite system, GNSS), frequency modulation (frequency modulation, FM), NFC, an infrared (infrared, IR) technology, and the like. The wireless communications module 160 may be one or more devices integrating at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation. When the electronic device 100 is the first device, the wireless communications module 160 may provide an NFC wireless communication solution applied to the electronic device 100, which means that the first device includes an NFC chip. The NFC chip can improve an NFC wireless communication function. When the electronic device 100 is the second device, the wireless communications module 160 may provide an NFC wireless communication solution applied to the electronic device 100, which means that the first device includes an electronic tag (for example, an RFID tag). When approaching the electronic tag, an NFC chip of another device may perform NFC wireless communication with the second device.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-code division multiple access (time-division code division multiple access, TD-SCDMA), long term evolution (long term evolution, LTE), BT, the GNSS, the WLAN, the NFC, the FM, the IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS).

The electronic device 100 implements the display function through the GPU, the display 194, the application processor, and the like. The GPU is a microprocessor for image processing, and is connected to the display 194 and the application processor. The GPU is configured to perform mathematical and geometric calculation, and perform graphics rendering. The processor 110 may include one or more GPUs, which execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), mini-LED, a micro-LED, a micro-OLED, a quantum dot light emitting diode (quantum dot light emitting diodes, QLED), or the like. In some embodiments, the electronic device 100 may include one or N displays, where N is a positive integer greater than 1.

The electronic device 100 may implement the photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens. The photosensitive element of the camera converts an optical signal into an electrical signal, and transmits the electrical signal to the ISP for processing. The ISP converts the electrical signal into an image that is visible to the eye. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP. The ISP converts the electrical signal into a digital image signal, and outputs the digital image signal to the DSP for processing. The DSP converts the digital image signal into a standard image signal in a format such as RGB or YUV. In some embodiments, the electronic device 100 may include one or N cameras, where N is a positive integer greater than 1.

The digital signal processor is configured to process a digital signal. In addition to the digital image signal, the digital signal processor may further process another digital signal. For example, when the electronic device 100 selects a frequency, the digital signal processor is configured to perform Fourier transform on frequency energy, and the like.

The video codec is configured to compress or decompress a digital video. The electronic device 100 may support one or more codecs. Therefore, the electronic device 100 may play or record videos in a plurality of encoding formats, for example, MPEG (moving picture experts group, MPEG)-1, MPEG-2, MPEG-3, and MPEG-4.

The NPU is a neural-network (neural-network, NN) computing processor. The NPU quickly processes input information by referring to a biological neural network structure, for example, by referring to a mode of transfer between human brain neurons, and may further continuously perform self-learning. Intelligent cognition of the electronic device 100 such as image recognition, facial recognition, speech recognition, and text understanding can be implemented by using the NPU.

The external memory interface 120 may be configured to connect to an external memory card such as a micro SD card, to extend a storage capability of the electronic device 100. The external memory card communicates with the processor 110 through the external memory interface 120, to implement a data storage function, for example, to store files such as music and a video in the external memory card.

The internal memory 121 may be configured to store computer-executable program code. The executable program code includes an instruction. The processor 110 runs the instruction stored in the internal memory 121, to implement various function applications and data processing of the electronic device 100. The internal memory 121 may include a program storage area and a data storage area. The program storage area may store an operating system, an application required by at least one function (for example, a sound playing function and an image playing function), and the like. The data storage area may store data (such as audio data and a phone book) created when the electronic device 100 is used, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement audio functions such as music playback and recording functions through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to perform audio signal encoding and decoding. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may listen to music or answer a hands-free call through the speaker 170A.

The receiver 170B, also referred to as an "earpiece", is configured to convert an audio electrical signal into a sound signal. When the electronic device 100 answers a call or receives a voice message, the receiver 170B may be put close to a human ear to listen to the voice message.

The microphone 170C, also referred to as a "mike" or a "microphone", is configured to convert a sound signal into an electrical signal. When making a call or sending a voice message, a user may make a sound near the microphone 170C through the mouth of the user, to enter a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, identify a sound source, implement a directional recording function, and the like.

The headset jack 170D is configured to connect to a wired headset. The headset jack 170D may be the USB port 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed in the display 194. There are many types of pressure sensors 180A, for example, a resistive pressure sensor, an inductive pressure sensor, and a capacitive pressure sensor. The capacitive pressure sensor may include at least two parallel plates made of conductive materials. A capacitance between electrodes changes when force is applied to the pressure sensor 180A. The electronic device 100 determines a pressure strength based on a capacitance change. When a touch operation is performed on the display 194, the electronic device 100 detects a strength of the touch operation based on the pressure sensor 180A. The electronic device 100 may also calculate a touch position based on a detection signal of the pressure sensor 180A. In some embodiments, touch operations that are performed on a same touch position but have different touch operation strengths may correspond to different operation instructions. For example, when a touch operation whose touch operation strength is less than a first pressure threshold is performed on an icon of Messages, an instruction for viewing an SMS message is executed; or when a touch operation whose touch operation strength is greater than or equal to a first pressure threshold is performed on an icon of Messages, an instruction for creating a new SMS message is executed.

The gyroscope sensor 180B may be configured to determine a motion posture of the electronic device 100. In some embodiments, an angular velocity of the electronic device 100 around three axes (that is, axes x, y, and z) may be determined through the gyroscope sensor 180B. The gyroscope sensor 180B may be used for image stabilization during photographing. For example, when the shutter is pressed, the gyroscope sensor 180B detects an angle at which the electronic device 100 jitters, calculates, based on the angle, a distance for which a lens module needs to compensate, and allows the lens to eliminate the jitter of the electronic device 100 through a reverse motion, to implement image stabilization. The gyroscope sensor 180B may be further used in a navigation scenario and a somatic game scenario.

The barometric pressure sensor 180C is configured to measure barometric pressure. In some embodiments, the electronic device 100 calculates an altitude by using an atmospheric pressure value obtained by the barometric pressure sensor 180C through measurement, to assist in positioning and navigation.

The magnetic sensor 180D includes a Hall sensor. The electronic device 100 may detect opening and closing of a flip cover through the magnetic sensor 180D. In some embodiments, when the electronic device 100 is a clamshell phone, the electronic device 100 may detect opening and closing of a flip cover based on the magnetic sensor 180D, to set a feature such as automatic unlocking through flipping based on a detected opening or closing state of the flip cover.

The acceleration sensor 180E may detect acceleration values in various directions (usually on three axes) of the electronic device 100, and may detect a gravity value and a gravity direction when the electronic device 100 is still. The acceleration sensor 180E may be further configured to identify a posture of the electronic device, and is applied to applications such as a pedometer and switching between a landscape mode and a portrait mode.

The range sensor 180F is configured to measure a distance. The electronic device 100 may measure a distance in an infrared or a laser manner. In some embodiments, in a photographing scenario, the electronic device 100 may measure a distance through the range sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, through the optical proximity sensor 180G, that the user holds the electronic device 100 close to the ear for a call, to automatically perform screen-off for power saving. The optical proximity sensor 180G may also be used in a smart cover mode or a pocket mode to automatically perform screen unlocking or locking.

The ambient light sensor 180L is configured to sense ambient light luminance. The electronic device 100 may adaptively adjust luminance of the display 194 based on the sensed ambient light luminance. The ambient light sensor 180L may be further configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application lock access, fingerprint-based photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of the processor nearby the temperature sensor 180J, to reduce power consumption for thermal protection. In some other embodiments, when the temperature is less than another threshold, the electronic device 100 heats the battery 142, to prevent the electronic device 100 from being abnormally powered off because of a low temperature. In some other embodiments, when the temperature is less than still another threshold, the electronic device 100 boosts an output voltage of the battery 142, to prevent abnormal power-off caused by a low temperature.

The touch sensor 180K is also referred to as a "touch panel". The touch sensor 180K may be disposed in the display 194. The touch sensor 180K and the display 194 form a touchscreen. The touch sensor 180K is configured to detect a touch operation performed on or near the touch sensor 180K. The touch sensor may transfer the detected touch operation to the application processor, to determine a type of a touch event, and to provide a visual output related to the touch operation through the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may alternatively be disposed in a headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be used for an incoming call vibration prompt, or may be used for a touch vibration feedback. For example, touch operations performed on different applications (for example, photographing and audio playback) may also correspond to different vibration feedback effects. Touch operations performed on different areas on the display 194 may correspond to different vibration feedback effects of the motor 191. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, which may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into one SIM card interface 195. The plurality of cards may be of a same type or different types. The SIM card interface 195 may also be compatible with different types of SIM cards. The SIM card interface 195 may also be compatible with an external memory card. The electronic device 100 interacts with a network by using the SIM card, to implement functions such as calling and data communication. In some embodiments, the electronic device 100 uses an eSIM, that is, an embedded SIM card. The eSIM card may be embedded in the electronic device 100, and cannot be separated from the electronic device 100.

Figure 2:
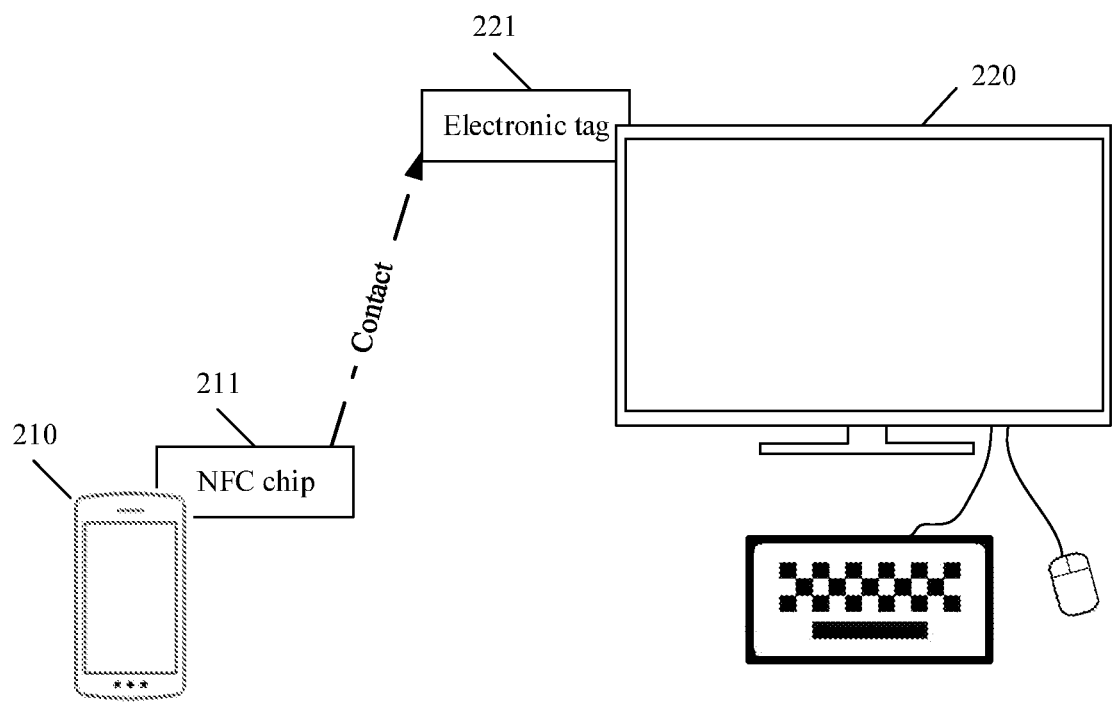
FIG. 2 is a schematic diagram 1 of an instance of a communication scenario to which a data transfer method is applied according to an embodiment of this application.

FIG. 2 is a schematic diagram of an instance of a communication scenario to which a data transfer method is applied according to an embodiment of this application. The method in this embodiment of this application may be applied to a process in which a user uses a first device 210 (for example, a mobile phone) to approach a second device 220 (for example, a PC) to transfer a file to the second device 220. The first device 210 is provided with an NFC chip 211, and the second device 220 is provided with an electronic tag 221. The electronic tag 221 may include device information of the second device. When the first device 210 approaches the second device 220, the first device may read information in the electronic tag 221, that is, the device information of the second device. The first device may establish a communication connection to the second device based on the device information of the second device, and then automatically send, to the second device through the communication connection, a first file corresponding to an interface currently displayed by the first device. It should be noted that, before the first device 210 approaches the second device 220, the first device 210 may have established a communication connection to the second device 220. In this case, after approaching the second device 220, the first device 210 may not need to establish a communication connection to the second device, but may directly send the first file corresponding to the currently displayed interface to the second device automatically. The communication connection is not limited in this embodiment. For example, the communication connection may include a Bluetooth connection, or may include a Wi-Fi connection, or may include both a Bluetooth connection and a Wi-Fi connection. In another implementation, the first device may first establish a Bluetooth connection to the second device based on the device information of the second device, and then the two devices transfer a Wi-Fi parameter through the Bluetooth connection and establish a Wi-Fi connection. Then, the two devices transfer a file through the Wi-Fi connection. It should be noted that, before the first device approaches the second device (that is, before a distance between the NFC chip 211 and the electronic tag 221 is less than a first threshold, the first device may have established a Bluetooth connection to the second device. In this case, the two devices may directly transfer the Wi-Fi parameter through the Bluetooth connection, to establish the Wi-Fi connection. After establishing a Bluetooth connection for the first time, the first device and the second device may maintain a Bluetooth persistent connection in the background, so that the Wi-Fi connection can be directly established based on the Bluetooth connection when the first device subsequently approaches the second device (the distance is less than the first threshold). In a solution in which the two devices maintain the Bluetooth persistent connection, if the distance between the two devices increases (the distance is greater than a second threshold), the Bluetooth connection is interrupted. If the distance between the two devices decreases (that is, is less than or equal to the second threshold), the two devices automatically establish a Bluetooth connection. The second threshold is greater than the first threshold. Generally, the second threshold is, for example, about 10 meters or farther, and the first threshold is, for example, 10 or 20 centimeters.

The following describes a method procedure of this application by using specific embodiments. The Bluetooth connection and the Wi-Fi connection may be replaced with other types of communication connection.

In a first application scenario, the electronic tag 221 is pasted on the second device 220 before the second device 220 is delivered from a factory. The electronic tag 221 stores a tag ID of the electronic tag 221 and a Bluetooth address of the second device 220. A tag ID of an electronic tag 221 may uniquely identify the electronic tag 221. The tag ID of the electronic tag 221 in the first application scenario may also uniquely identify the second device 220. For example, the tag ID of the electronic tag 221 may be a product serial number (serial number, SN) or another device identifier of the second device 220.

In a second application scenario, the electronic tag 221 is added to the second device 220 after the second device 220 is delivered from a factory. For example, the electronic tag may be pasted on the second device 220 by a user or a vendor. The electronic tag 221 stores a tag ID of the electronic tag 221. Because the electronic tag 221 is added to the second device after delivery, the electronic tag 221 does not include information about the second device 220.

The tag ID of the electronic tag 221 can only uniquely identify the electronic tag 221, and cannot identify the second device 220. The electronic tag 221 does not include a Bluetooth address of the second device 220.

Figures 1, 3A:
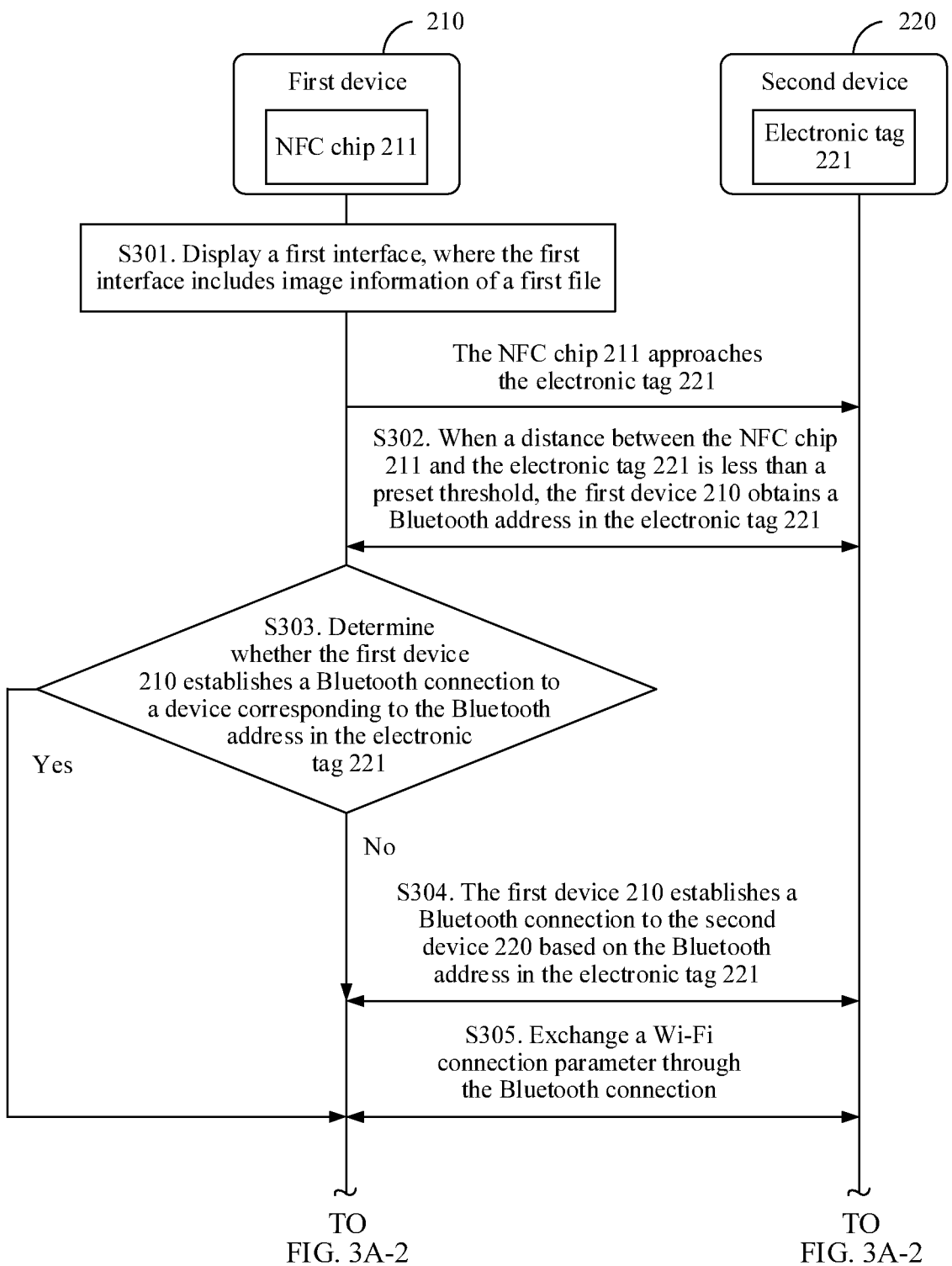
Figures 2, 3A:
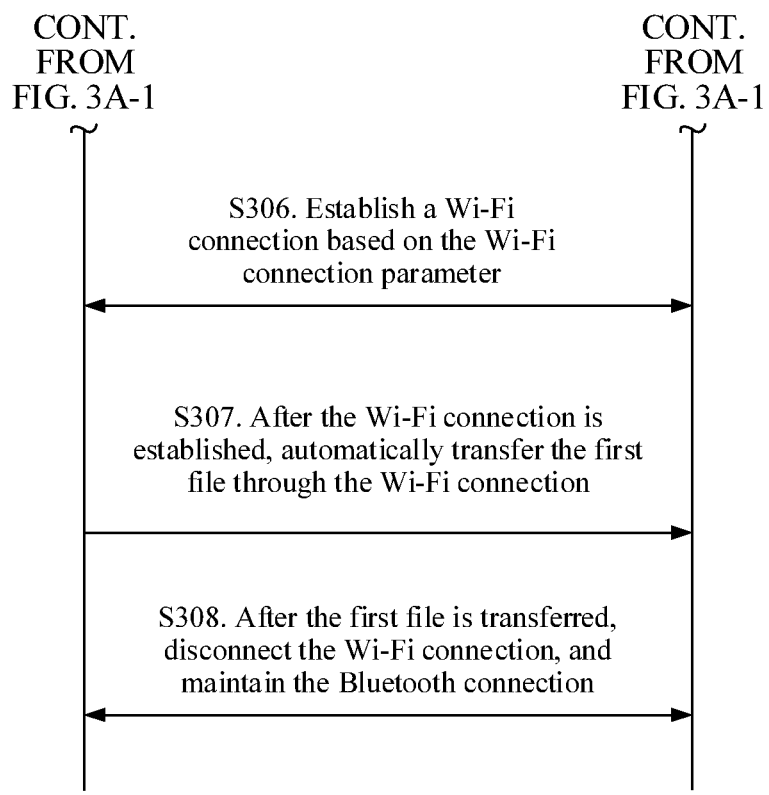

With reference to the foregoing first application scenario, the electronic tag 221 stores the tag ID of the electronic tag 221 and the Bluetooth address of the second device 220. An embodiment of this application provides a data transfer method. As shown in FIG. 3A-1 and FIG. 3A-2, the data transfer method may include S301 to S307.

S301. The first device 210 displays a first interface, where the first interface includes image information of a first file.

The image information of the first file is image content that is currently displayed in the first interface and that is related to the first file or belongs to the first file. For example, the first interface may include one or more pictures, and the first file may be at least one picture in the first interface. The image information of the first file is one or more pictures displayed in the first interface, and may be a picture displayed in full screen, or may be a thumbnail. Alternatively, the first interface may be a home screen (that is, a home screen) of the first device 210, the first file may be a screenshot of the home screen, and the image information of the first file is a currently displayed home screen. Alternatively, the first interface may be a video playing interface, the first file may be a video file that is being played by the first device 210 or address information of a video file that is being played by the first device 210, and the image information of the first file is a currently displayed video footage. Alternatively, the first interface may be a browser page of the first device 210, the first file may be a page address or a screenshot of the page, and the image information of the first file is a currently displayed browser page. Alternatively, the first interface may be image information of a document (for example, a Word document or an Excel document) opened by the first device 210, in other words, the image information is a page, a directory, or the like of the document, that is, content of the document currently displayed in the first interface, and the first file may be the document opened by the first device 210.

The first interface and the first file in this embodiment of this application include but are not limited to the first interface and the first file in the foregoing examples.

S302. When a distance between the NFC chip 211 of the first device 210 and the electronic tag 221 of the second device is less than a preset threshold, the first device 210 obtains the Bluetooth address in the electronic tag 221.

Specifically, the electronic tag 221 stores the Bluetooth address of the second device. Therefore, when the distance between the NFC chip 211 and the electronic tag 221 is less than the preset threshold, the NFC chip 211 may send an electromagnetic wave, and in response to the electromagnetic wave, the electronic tag 221 may send data stored in the electronic tag 221 to the NFC chip 211, for example, the Bluetooth address of the second device and the tag ID.

After obtaining the Bluetooth address in the electronic tag 221, the first device 210 may first determine whether the first device 210 enables a Bluetooth function. If the first device 210 has enabled the Bluetooth function, S303 may be performed. If the first device 210 has not enabled the Bluetooth function, the first device 210 may first enable the Bluetooth function, and then perform S303. When performing step S302, the first device 210 is in a state of displaying the first interface. In other words, the first device approaches the second device in a state of displaying the first interface.

S303. The first device 210 determines whether the first device 210 establishes a Bluetooth connection to a device corresponding to the Bluetooth address in the electronic tag 221.

The device corresponding to the Bluetooth address in the electronic tag 221 is the second device. For example, it is assumed that the first device 210 has established Bluetooth connections to devices corresponding to two Bluetooth addresses. For example, the first device 210 establishes a Bluetooth connection to a device corresponding to a Bluetooth address a and establishes a Bluetooth connection to a device corresponding to a Bluetooth address b. If the Bluetooth address of the second device 220 is a Bluetooth address c, it indicates that the first device 210 has not established a Bluetooth connection to the second device 220, and the first device 210 may perform S304 and S305. If the Bluetooth address of the second device 220 is the Bluetooth address a or the Bluetooth address b, it indicates that the first device 210 has established a Bluetooth connection to the second device 220, and the first device 210 may perform S305.

After performing a Bluetooth connection for the first time, the first device 210 and the second device 220 may maintain a Bluetooth persistent connection. To be specific, after the two devices perform the Bluetooth connection for the first time, if the distance between the two devices is less than or equal to a second threshold, the Bluetooth connection is always maintained. With use of a user, if the distance between the two devices is greater than the second threshold, that is, exceeds a distance within which the Bluetooth connection can be maintained, the Bluetooth connection between the devices is interrupted. Then, with use of the user, if the distance between the two devices is less than or equal to the second threshold again, the two devices automatically establish a Bluetooth connection. That is, as long as the distance between the two devices meets a Bluetooth connection requirement, the two devices automatically establish a Bluetooth connection and maintain the Bluetooth connection. When the Bluetooth persistent connection is maintained between the two devices, in S303, the first device 210 determines that the first device 210 has established the Bluetooth connection to the second device.

S304. The first device 210 establishes a Bluetooth connection to the second device 220 based on the Bluetooth address in the electronic tag 221.

Figure 3B:
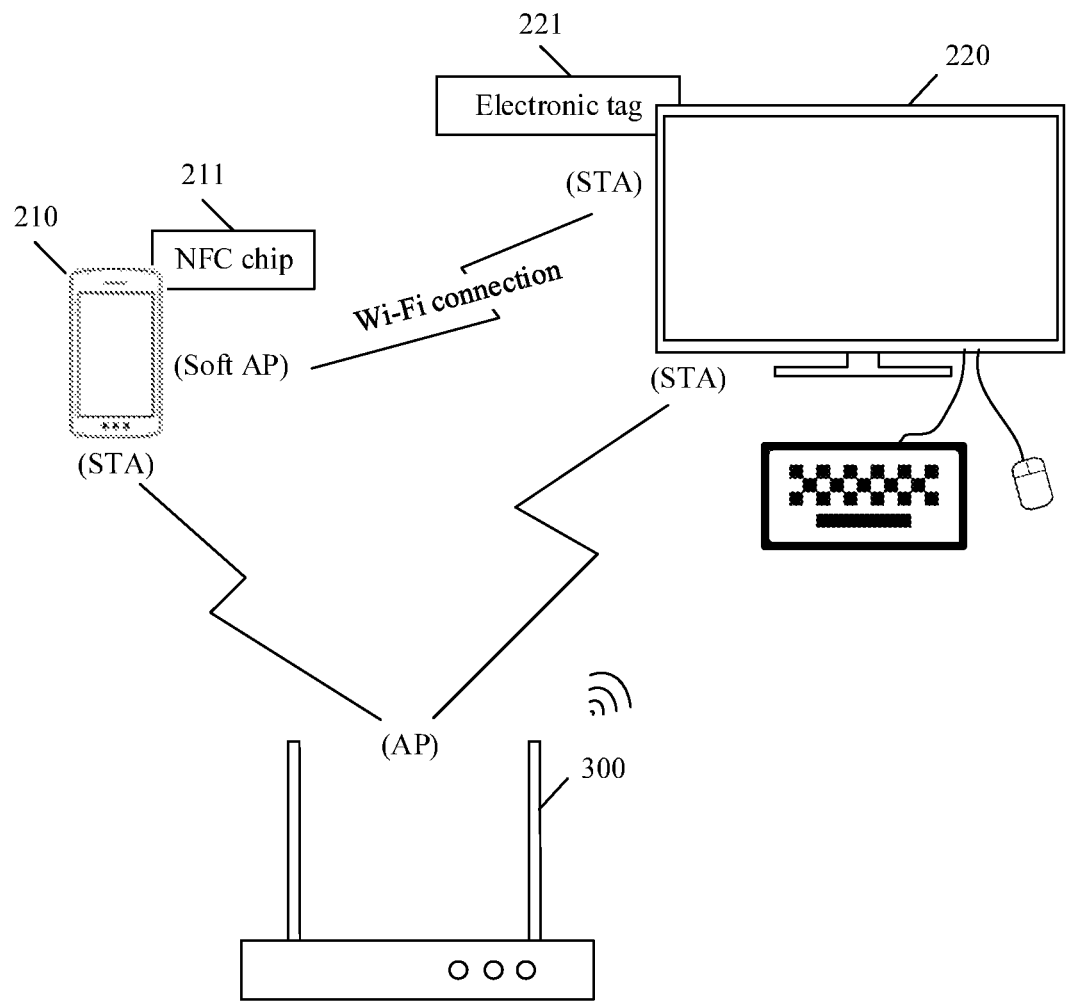
FIG. 3B is a schematic diagram 2 of an instance of a communication scenario to which a data transfer method is applied according to an embodiment of this application.
Figures 1, 3C:
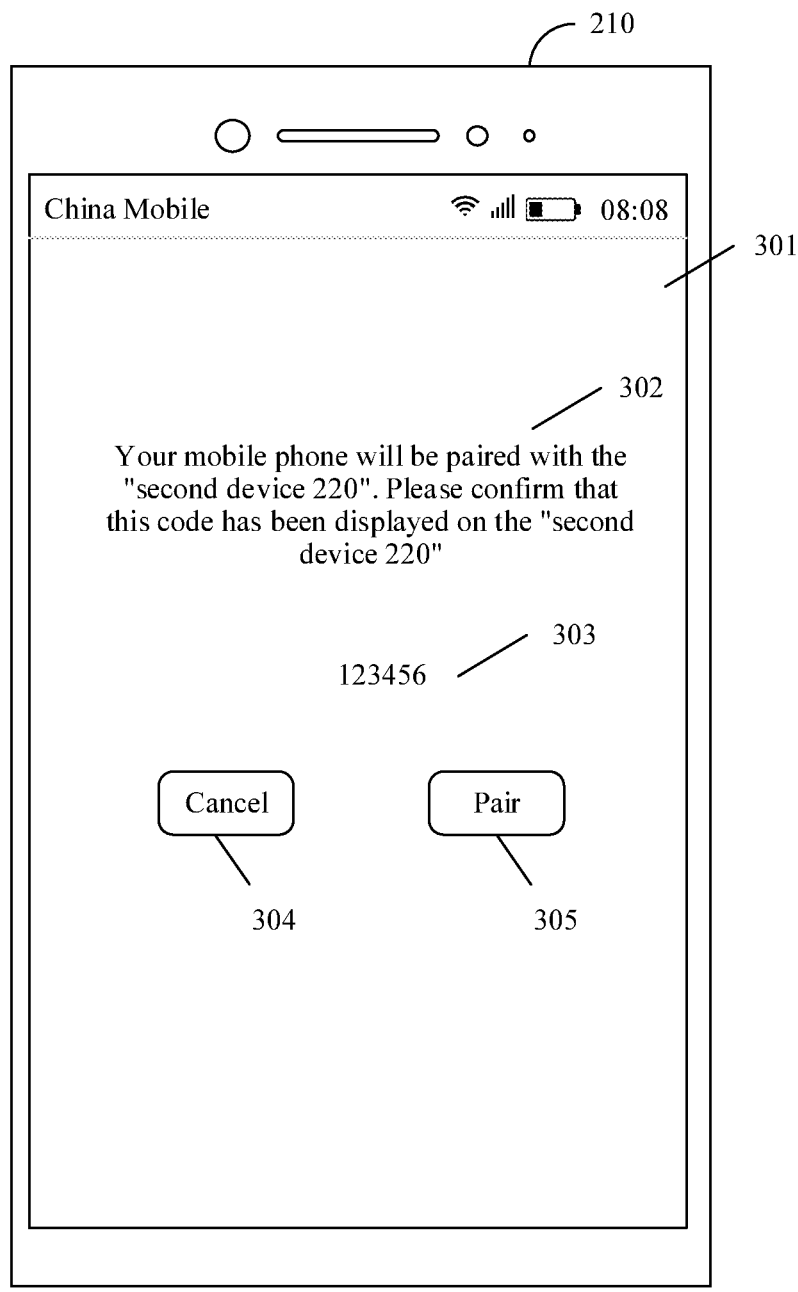
Figures 2, 3C:
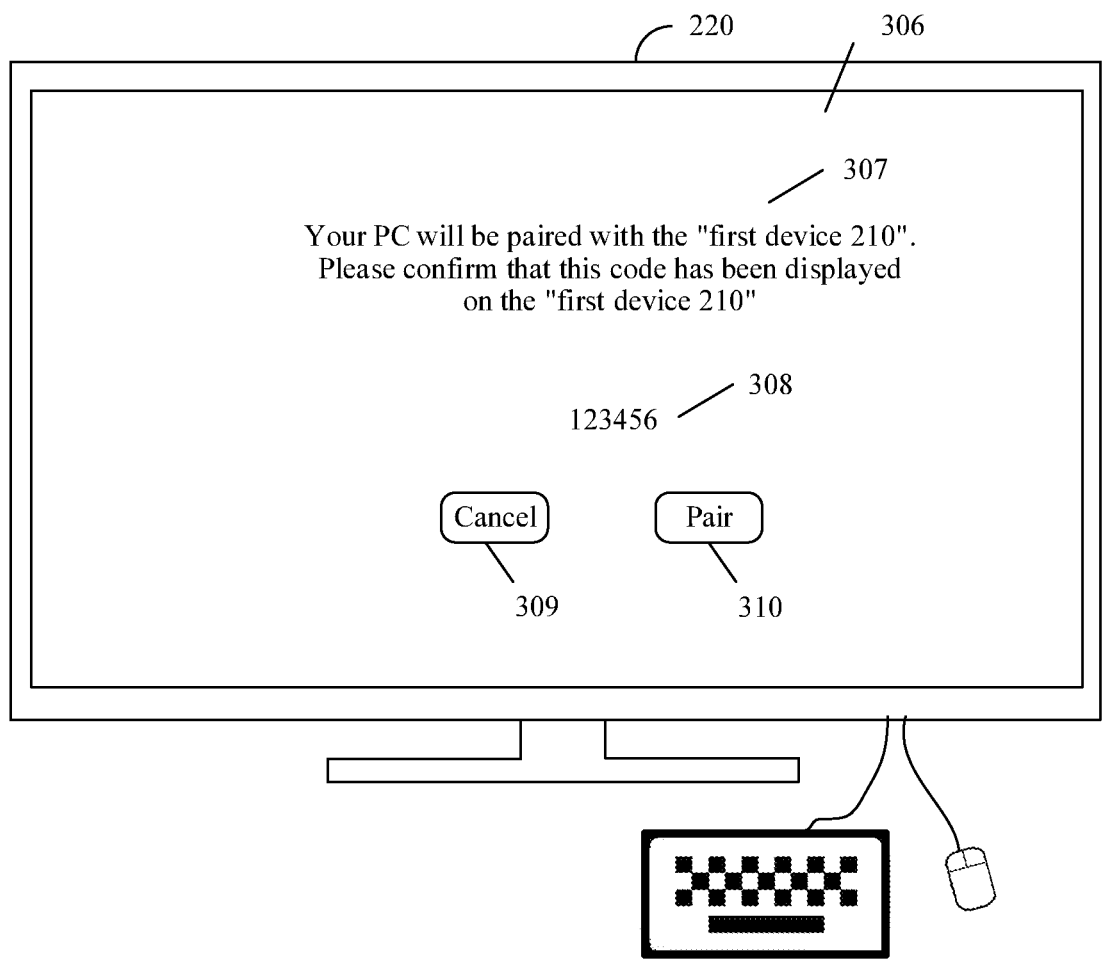

The first device 210 may request to establish a Bluetooth connection to the second device 220 corresponding to the Bluetooth address in the electronic tag 221. If the first device 210 has not established a Bluetooth connection to the second device 220, after the first device 210 sends a Bluetooth connection request to the second device 220, the first device 210 and the second device 220 may display a prompt interface used for Bluetooth pairing between the first device 210 and the second device 220. For example, as shown in FIG. 3C-1, the first device 210 may display a prompt interface 301. The prompt interface 301 includes prompt information 302 "Your mobile phone will be paired with the 'second device 220'. Please confirm that this code has been displayed on the 'second device 220'", a code 303 "123456", a "cancel" button 304, and a "pair" button 305. As shown in FIG. 3C-2, the second device 220 may display a prompt interface 306. The prompt interface 306 includes prompt information 307 "Your PC will be paired with the 'first device 210'. Please confirm that this code has been displayed on the 'first device 210'", a code 308 "123456", a "cancel" button 309, and a "pair" button 310.

If the first device 210 receives a tap operation (for example, a single tap operation) performed by the user on the "pair" button 305, and the second device 220 receives a tap operation (for example, a single tap operation) performed by the user on the "pair" button 310, the first device 210 and the second device 220 may complete Bluetooth pairing, and establish the Bluetooth connection. In this embodiment of this application, the first device 210 and the second device 220 perform Bluetooth pairing, so that the first device 210 and the second device 220 are authorized to become mutually trusted Bluetooth devices.

It should be noted that, when the first device 210 establishes a Bluetooth connection to the second device 220 for the first time, Bluetooth pairing needs to be performed. After the first device 210 completes Bluetooth pairing with the second device 220, if the first device 210 establishes a Bluetooth connection to the second device 220 again, Bluetooth pairing does not need to be performed.

S305. The first device 210 exchanges a Wi-Fi connection parameter with the second device 220 through the Bluetooth connection.

If the distance between the NFC chip 211 and the electronic tag 221 is less than the preset threshold, the electronic tag 221 may receive an electromagnetic wave sent by the NFC chip 211. In response to the electromagnetic wave, the second device 200 may serve as a soft (Soft) access point (Access Point, AP) to exchange the Wi-Fi connection parameter with the second device 200 serving as a station (Station, STA) through the Bluetooth connection.

S306. The first device 210 establishes a Wi-Fi connection to the second device 220 based on the Wi-Fi connection parameter, that is, establishes a first Wi-Fi connection.

For example, the Wi-Fi connection parameter may include parameters such as a service set identifier (service set identifier, SSID) and an access password (pass word, PWD) of the soft AP, a Wi-Fi capability of the STA (for example, the STA supports Wi-Fi 5G and Wi-Fi 2.4G, or the STA supports Wi-Fi 2.4G), and a transfer rate supported by the STA.

S307. After the Wi-Fi connection in S306 is established, the first device 210 automatically transfers the first file to the second device 220 through the Wi-Fi connection.

After the first device 210 accesses a Wi-Fi network provided by the second device 220 (that is, the first device 210 establishes the Wi-Fi connection to the second device 220), the first device 210 may automatically transfer, to the second device 220 through the Wi-Fi connection, the first file associated with the current interface (that is, the first interface) displayed by the first device 210. After the first file is transferred, the current transfer process ends, and the Wi-Fi connection between the first device 210 and the second device 220 is disconnected. Optionally, if a Bluetooth persistent connection is maintained between the first device 210 and the second device 220, the Bluetooth connection between the first device 210 and the second device 220 is still maintained. If no Bluetooth persistent connection is maintained between the two devices, the Bluetooth connection between the two devices is also disconnected. When the Bluetooth connection between the first device 210 and the second device 220 is maintained (that is, not disconnected), if the first device and the second device need to transfer another file next time, a new Wi-Fi connection may be directly established through the maintained Bluetooth connection, and then the file is transferred through the newly established Wi-Fi connection.

For example, when the first interface is a video playing interface, the first file automatically sent by the first device 210 to the second device 200 through the Wi-Fi connection may be a video file that is being played by the first device 210. When the first interface is a browser page, the first file automatically sent by the first device 210 to the second device 200 through the Wi-Fi connection may be a page address or a screenshot of the page. When the first interface is a home screen (that is, a home screen) of the first device 210, the first file automatically sent by the first device 210 to the second device 200 through the Wi-Fi connection may be a screenshot of the home screen. Alternatively, when the first interface does not have a corresponding file, picture, or browser page, the first device 210 may automatically send, to the second device 200 through the Wi-Fi connection, a screenshot of an interface currently displayed by the first device 210.

The second device 220 may receive the first file sent by the first device 210 through the Wi-Fi connection.

In some embodiments, after receiving the first file sent by the first device 210, the second device 220 may automatically open the first file, and display the image information of the first file.

Figures 1, 2, 3, 4A:
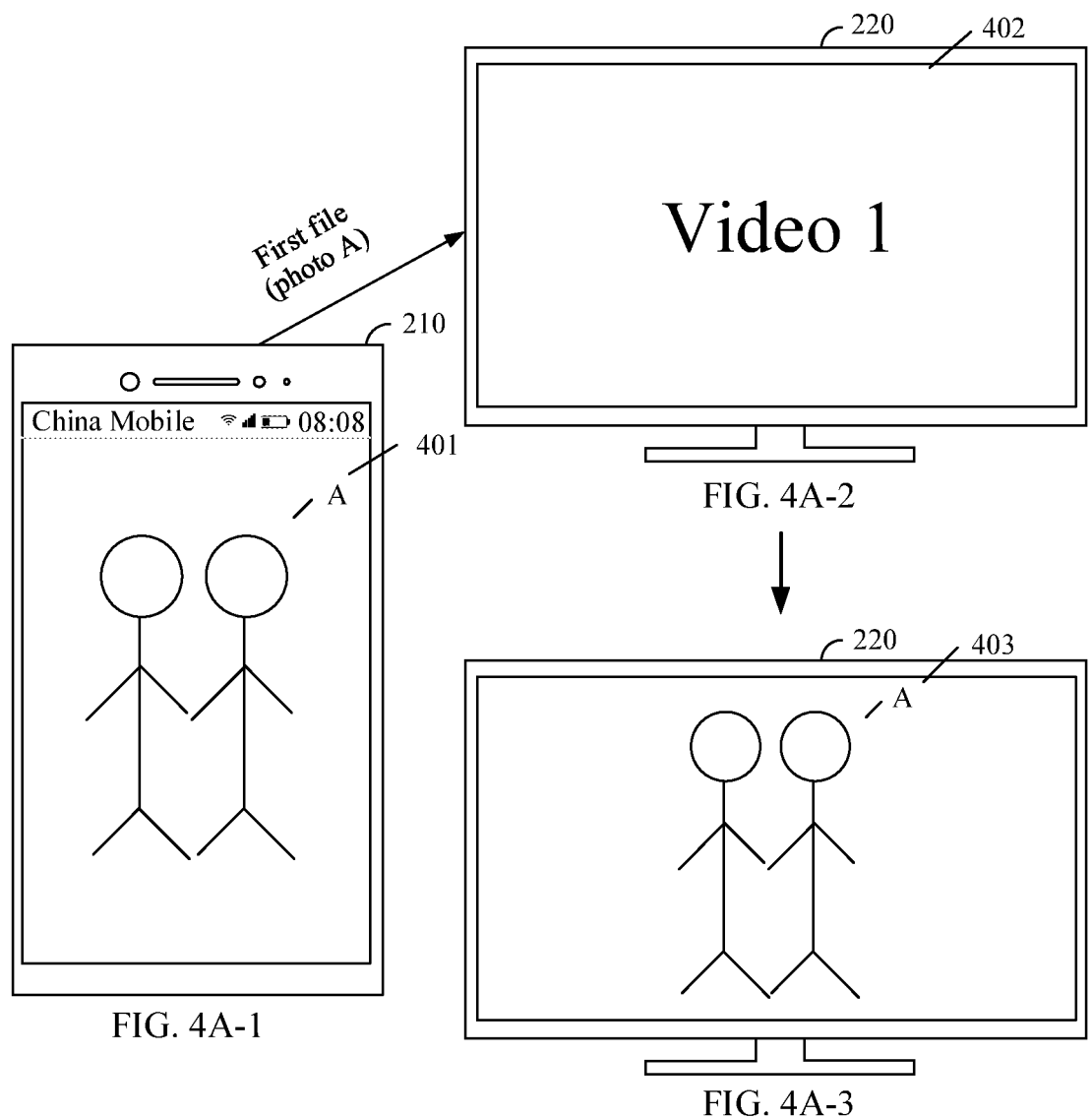

For example, it is assumed that the first device 210 displays a first interface 401 shown in FIG. 4A-1, and the second device 220 displays a second interface 402 shown in FIG. 4A-2. The first interface 401 shown in FIG. 4A-1 includes a photo A, and the second interface 402 shown in FIG. 4A-2 is a playing interface of a video 1. The first device 210 may perform S307 to send the first file (for example, the photo A) to the second device 220. After receiving the first file (for example, the photo A), the second device 220 may automatically open the received photo A, and display image information 403 of the photo A that is shown in FIG. 4A-3.

Figure 4B:
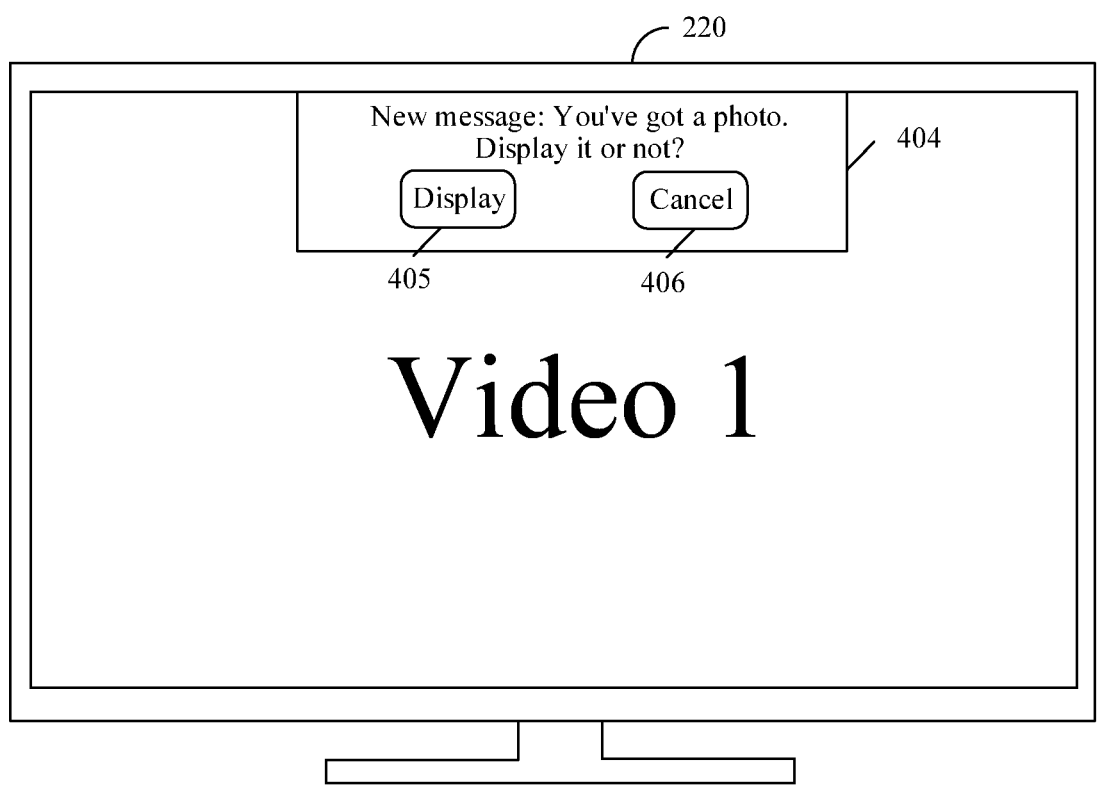
FIG. 4B is a schematic diagram 3 of an instance of a display interface of an electronic device according to an embodiment of this application.

In some other embodiments, after receiving the first file sent by the first device 210, the second device 220 may display prompt information of the first file. The prompt information is used to indicate that the second device 220 receives the first file. The prompt information may be further used to determine whether to display the first file. For example, with reference to the first interface shown in FIG. 4A-1 and the second interface 402 shown in FIG. 4A-2, after receiving the first file (for example, the photo A), as shown in FIG. 4B, the second device 220 may display prompt information 404 "New message: You've got a photo. Display it or not?" in a notification bar. The prompt information 404 may further include a "display" button 405 and a "cancel" button 406. The "display" button 405 is used to trigger the second device 220 to display the image information 403 of the photo A that is shown in FIG. 4A-3. The "cancel" button 406 is used to trigger the second device 220 to close the prompt information 404. After the second device 220 displays the prompt information 404 shown in FIG. 4B, if the second device 220 does not receive, within a specific time (for example, two minutes), a tap operation (for example, a single tap operation) performed by the user on the "display" button 405 or the "cancel" button 406, the prompt information 404 may automatically disappear, that is, the second device 220 does not display the prompt information 404.

A method for displaying the prompt information of the first file by the second device 220 includes but is not limited to displaying the prompt information in the notification bar. For example, the second device 220 may further display a prompt window including the prompt information. A specific manner of displaying the prompt information by the second device 220 is not limited in this embodiment of this application.

In an implementation, after S307, optionally, the method may further include the following steps S308 to S313.

S308. After the first file in S307 is transferred, the first device 210 disconnects the Wi-Fi connection to the second device 220, and maintains the Bluetooth connection to the second device 220.

S309. When the distance between the NFC chip of the first device 210 and the electronic tag 221 of the second device is less than the preset threshold again, that is, when the first device performs NFC contact with the second device again, the first device 210 obtains the Bluetooth address in the electronic tag 221 again. When the first device performs NFC contact with the second device again, the first device displays a fifth interface. The fifth interface includes image information of a third file. For the fifth interface and the image information of the third file, refer to the descriptions of the first interface and the image information of the first file in S301. The fifth interface may be an interface that is the same as or different from the first interface. The third file may be a file that is the same as or different from the first file, and the image information of the third file may be image information that is the same as or different from the image information of the first file.

S310. The first device 210 determines that the first device 210 has established the Bluetooth connection to the device corresponding to the Bluetooth address in the electronic tag 221. In other words, because the first device maintains the Bluetooth connection to the second device, the Bluetooth connection has been established between the two devices.

S311. The first device 210 exchanges a Wi-Fi connection parameter with the second device 220 through the established Bluetooth connection, and establishes a new Wi-Fi connection based on the Wi-Fi connection parameter, that is, establishes a second Wi-Fi connection.

S312. After the Wi-Fi connection in S311 is established, the first device 210 automatically transfers the third file to the second device 220 through the Wi-Fi connection.

S313. After the third file in S312 is transferred, the first device 210 may disconnect the Wi-Fi connection to the second device 220, and maintain the Bluetooth connection to the second device 220, so that a transfer speed can be increased during transfer of another file.

S309 to S313 are not shown in FIG. 3A-1 and FIG. 3A-2.

According to the data transfer method provided in this embodiment of this application, when the first device displays the first interface including the image information of the first file, if the NFC chip 211 of the first device approaches the electronic tag 221 of the second device 220, the first device 210 may obtain the Bluetooth address of the second device 220. The first device 221 may establish the Bluetooth connection to the second device 220 corresponding to the Bluetooth address, exchange the Wi-Fi connection parameter with the second device 220 through the Bluetooth connection, establish the Wi-Fi connection, and automatically transfer the first file to the second device 221 through the Wi-Fi connection.

The second device 220 does not need to be provided with an NFC chip, and costs of configuring the electronic tag are relatively low. Therefore, in this embodiment of this application, a file can be transferred through NFC contact without increasing hardware costs. In addition, as long as the NFC chip 211 approaches the electronic tag 221, the user can transfer, to the second device 220, the first file corresponding to the first interface currently displayed by the first device, thereby simplifying user operations.

Further, exchanging the Wi-Fi connection parameter through the Bluetooth connection can increase a speed of establishing the Wi-Fi connection, and improve file transfer efficiency. In addition, transferring the first file through the Wi-Fi connection can increase a file transfer rate.

Moreover, the Bluetooth persistent connection may be maintained between the first device and the second device. Therefore, when the NFC chip of the first device contacts the electronic tag of the second device, the Wi-Fi connection may be quickly established through the established Bluetooth connection, thereby further improving file transfer efficiency. If the Wi-Fi connection is always maintained, power consumption is relatively high. In this implementation solution, the Wi-Fi connection does not need to be always maintained (in other words, the Wi-Fi connection is disconnected after a file is transferred), and only the Bluetooth connection is maintained, so that a transfer rate can be increased while power consumption is low. In addition, because the two devices may maintain the Bluetooth persistent connection, a Bluetooth pairing authentication process may be omitted during next file transfer.

In this embodiment of this application, the user does not need to select a to-be-shared file, because the to-be-shared file in this embodiment of this application is the first file included in the first interface currently displayed by the first device. In addition, the user does not need to manually enable an NFC contact function, because in this embodiment of this application, when the NFC chip approaches the electronic tag of the second device, the NFC chip may obtain the Bluetooth address of the second device, and establish the Wi-Fi connection based on the Bluetooth connection corresponding to the Bluetooth address. The user does not need to tap a share button, because the first device may automatically transfer the first file to the second device through the Wi-Fi connection after the Wi-Fi connection is established. In conclusion, according to the method in this embodiment of this application, user operations in a process of transferring a file through NFC contact can be simplified, and user experience of transferring a file through NFC contact can be improved.

It should be noted that, in this embodiment of this application, when the first device 210 serves as a soft AP to establish a Wi-Fi connection to the second device 220 serving as a STA, the first device 210 and the second device 220 may also serve as STAs to access a Wi-Fi network provided by a third device (for example, a router). For example, as shown in FIG. 3B, the first device 210 serves as a soft AP to establish a Wi-Fi connection to the second device 220 serving as a STA. Certainly, the second device 220 may also serve as a soft AP to establish a Wi-Fi connection to the first device 210 serving as a STA. In addition, both the first device 210 and the second device 220 may serve as STAs to access a Wi-Fi network provided by a third device 300 (for example, a router) serving as an AP, and establish Wi-Fi connections to the third device 300. In this embodiment of this application, the Wi-Fi connection between the first device 210 and the second device 220 may be a Wi-Fi direct connection.

Figures 1, 4C:
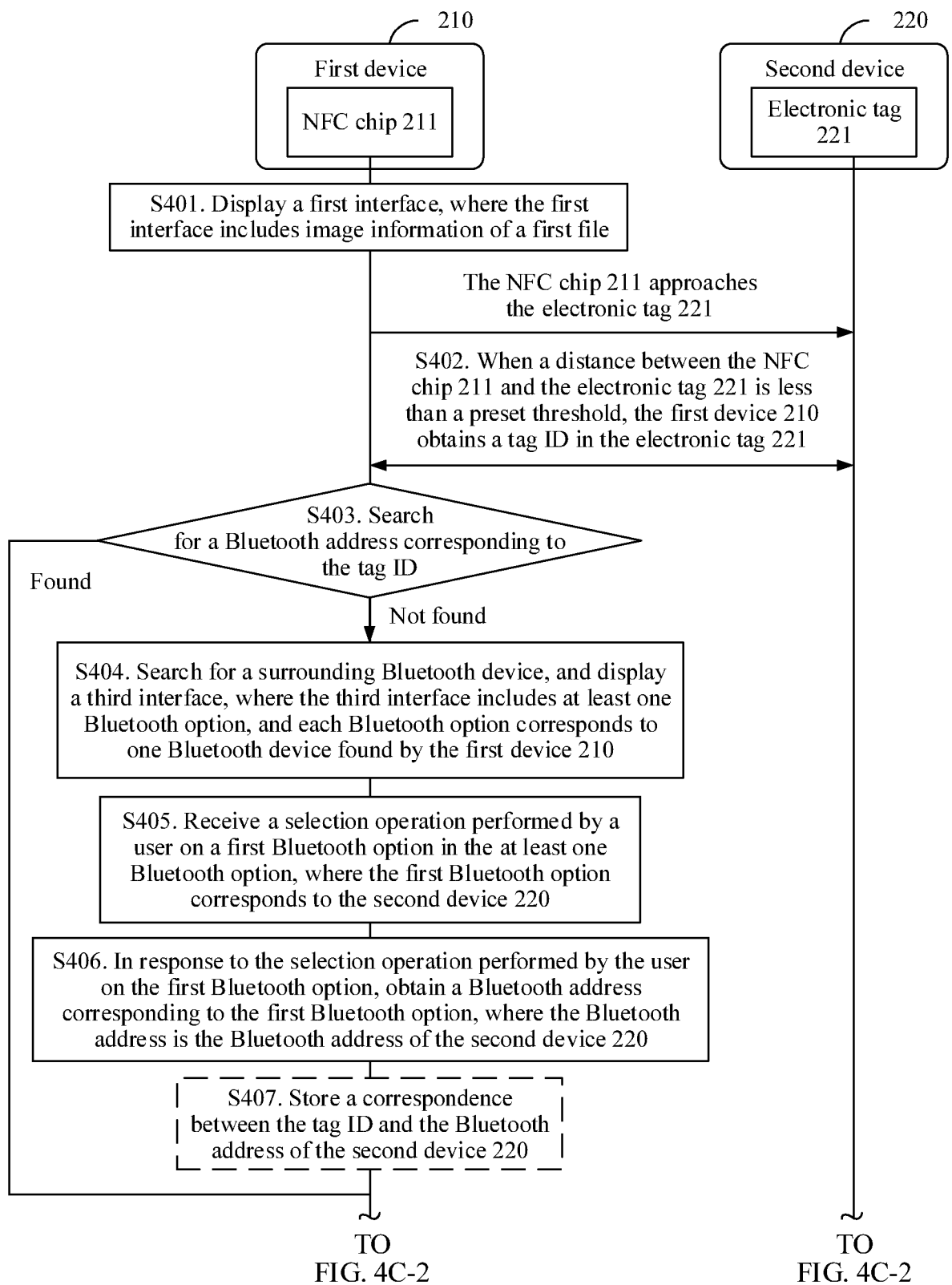
Figures 2, 4C:
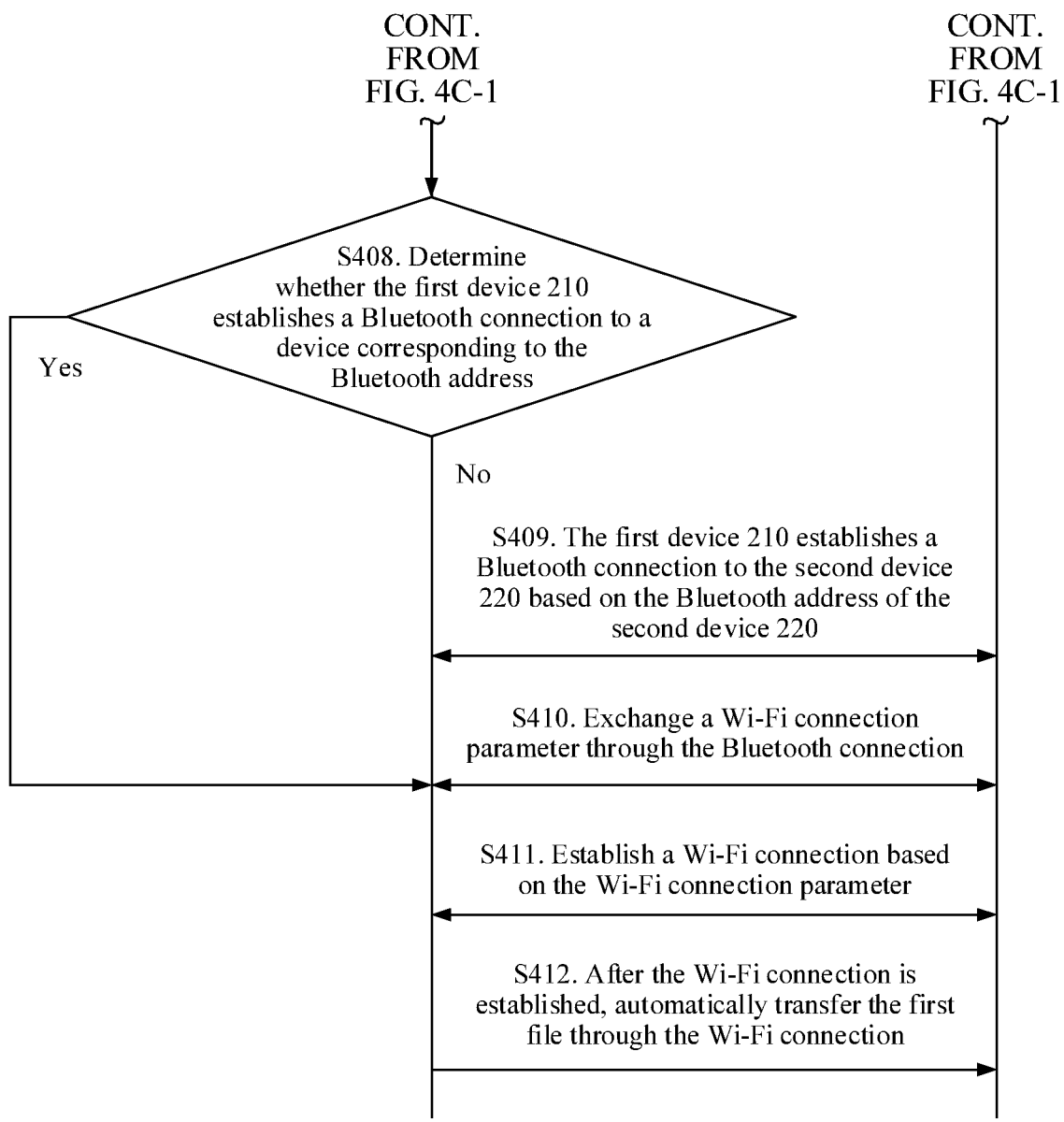

With reference to the foregoing second application scenario, the electronic tag 221 stores the tag ID of the electronic tag 221, but does not store the Bluetooth address of the second device 220. An embodiment of this application provides a data transfer method. As shown in FIG. 4C-1 and FIG. 4C-2, the data transfer method may include S401 to S412.

S401. The first device 210 displays a first interface, where the first interface includes image information of a first file.

S401 is the same as S301.

S402. When a distance between the NFC chip 211 of the first device 210 and the electronic tag 221 of the second device 220 is less than a preset threshold, the first device 210 obtains the tag ID in the electronic tag 221.

The electronic tag 221 stores the tag ID in the electronic tag 221. Therefore, when the distance between the NFC chip 211 and the electronic tag 221 is less than the preset threshold, the NFC chip 211 may send an electromagnetic wave, and in response to the electromagnetic wave, the electronic tag 221 may send data stored in the electronic tag 221 to the NFC chip 211, for example, the tag ID in the electronic tag 221.

S403. The first device 210 searches for the Bluetooth address corresponding to the tag ID.

The first device 210 may check whether the first device 210 stores the Bluetooth address corresponding to the tag ID. If the first device 210 does not store the Bluetooth address corresponding to the tag ID, the first device 210 does not find the Bluetooth address corresponding to the tag ID. If the first device 210 stores the Bluetooth address corresponding to the tag ID, the first device 210 may find the Bluetooth address corresponding to the tag ID. For a method for storing the tag ID and the Bluetooth address corresponding to the tag ID by the first device 210, refer to subsequent descriptions in this embodiment of this application.

Specifically, if the first device 210 does not find the Bluetooth address corresponding to the tag ID, the first device 210 performs S404. If the first device 210 finds the Bluetooth address corresponding to the tag ID, the first device 210 performs S408.

S404. The first device 210 searches for a surrounding Bluetooth device, and displays a third interface, where the third interface includes at least one Bluetooth option, and each Bluetooth option corresponds to one Bluetooth device found by the first device 210.

It may be understood that, if the first device 210 does not find the Bluetooth address corresponding to the tag ID, the first device 210 may display the third interface. The third interface includes a Bluetooth option corresponding to at least one Bluetooth device found by the first device 210. In this way, the first device 210 may receive a selection operation performed by a user on any Bluetooth option (for example, a first Bluetooth option) in the third interface, and determine that the Bluetooth address corresponding to the tag ID is a Bluetooth address of a Bluetooth device corresponding to the first Bluetooth option selected by the user.

The Bluetooth device found by the first device 210 is a device with a Bluetooth function enabled around the first device 210, for example, the second device.

S405. The first device 210 receives a selection operation performed by the user on the first Bluetooth option in the at least one Bluetooth option, where the first Bluetooth option corresponds to the second device.

Figure 5A:
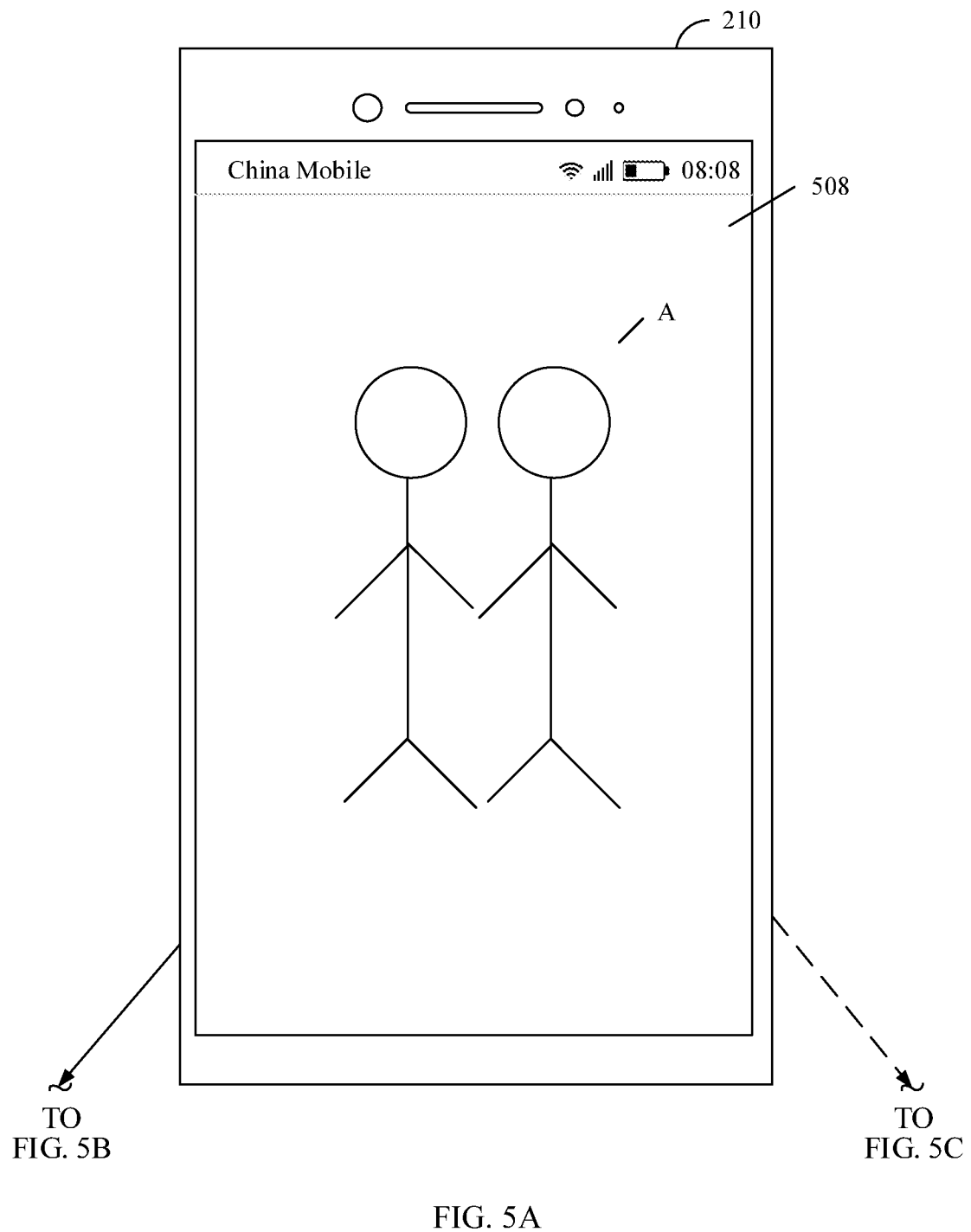
FIG. 5A, FIG. 5B, and FIG. 5C are a schematic diagram 4 of an instance of a display interface of an electronic device according to an embodiment of this application.

For example, it is assumed that the first device 210 is a mobile phone 210 shown in FIG. 5A. The mobile phone 210 displays a first interface 508 shown in FIG. 5A. The first interface 508 is a display interface of a photo A. When the distance between the NFC chip of the mobile phone 210 and the electronic tag 221 is less than the preset threshold, the mobile phone 210 may obtain the tag ID in the electronic tag 221. Assuming that the mobile phone 210 does not store the Bluetooth address corresponding to the tag ID, the mobile phone 210 does not find the Bluetooth address corresponding to the tag ID. In this case, the mobile phone 210 may search for a surrounding Bluetooth device, and display a third interface 501 shown in FIG. 5B or a third interface 506 shown in FIG. 5C.

Figure 5B:
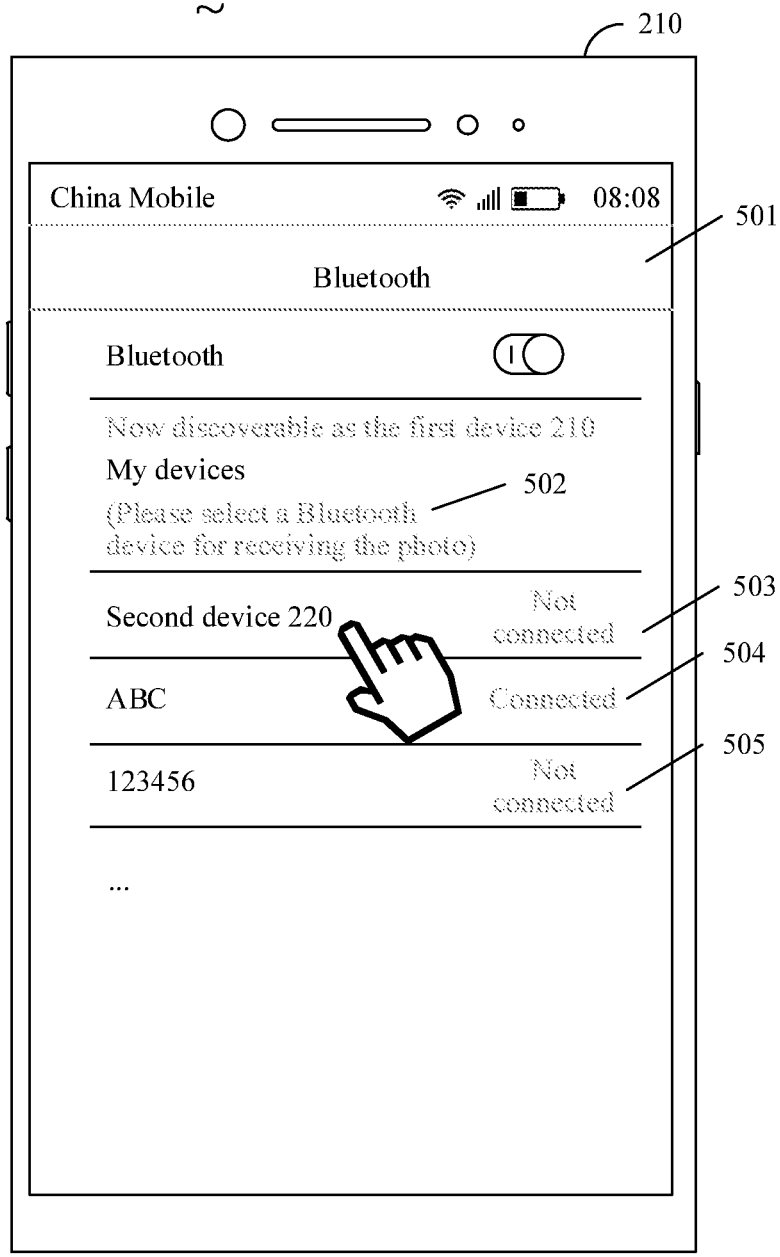
Figure 5C:
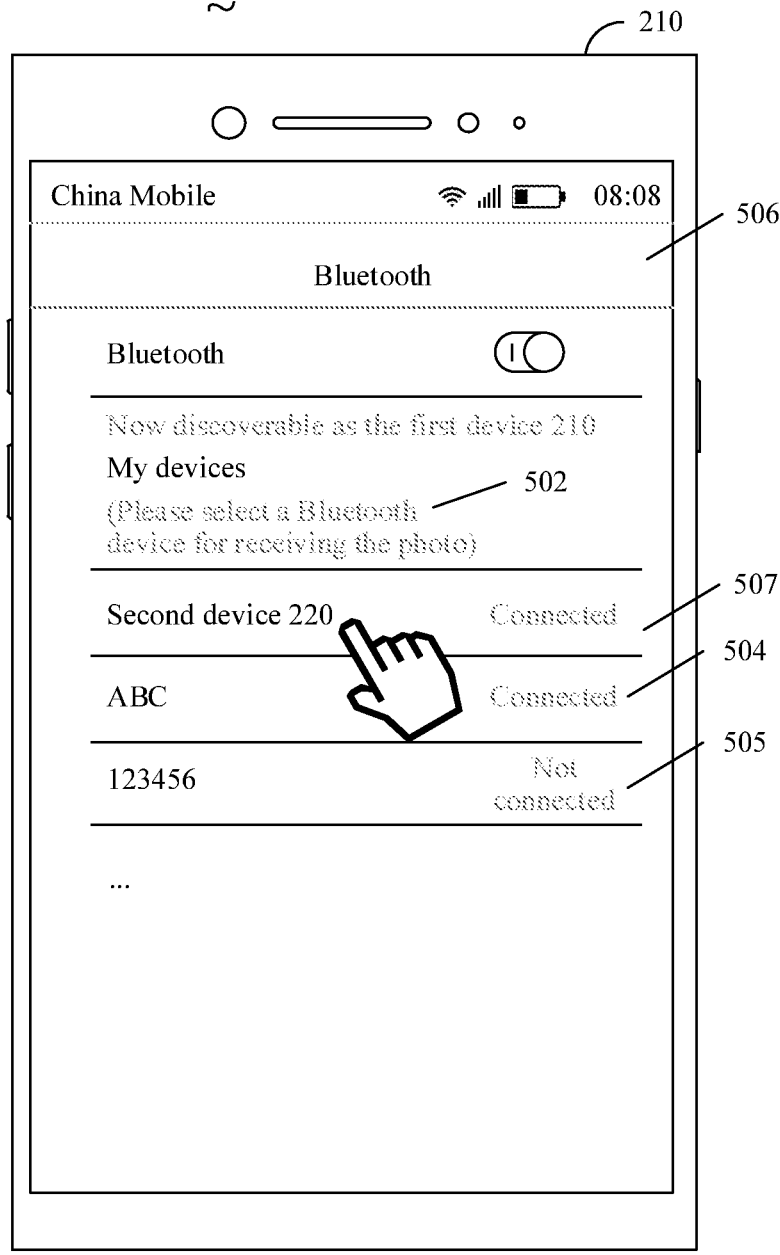

It is assumed that a Bluetooth identifier of the second device 220 is "second device 220", and the mobile phone 210 may find Bluetooth devices whose Bluetooth identifiers are "second device 220", "ABC", and "123456". If the mobile phone 210 does not establish a Bluetooth connection to the second device 220, as shown in FIG. 5B, the third interface 501 includes a Bluetooth option 503 "second device 220", a Bluetooth option 504 "ABC", and a Bluetooth option 505 "123456". If the mobile phone 210 has established a Bluetooth connection to the second device 220, as shown in FIG. 5C, the third interface 506 includes a Bluetooth option 507 "second device 220", a Bluetooth option 504 "ABC", and a Bluetooth option 505 "123456". Optionally, the third interface may further include prompt information used to prompt the user to select a Bluetooth device for receiving the first file. For example, the third interface 501 and the third interface 506 may include prompt information 502 "Please select a Bluetooth device for receiving a photo".

S406. In response to the selection operation performed by the user on the first Bluetooth option, the first device 210 obtains a Bluetooth address corresponding to the first Bluetooth option, where the Bluetooth address is the Bluetooth address of the second device 220.

With reference to the foregoing example, the first Bluetooth option may be the Bluetooth option 503 "second device 220" shown in FIG. 5B or the Bluetooth option 507 "second device 220" shown in FIG. 5C. The mobile phone 210 may receive a selection operation (for example, a single tap operation, a double tap operation, or a touch and hold operation) performed by the user on the Bluetooth option 503 "second device 220" shown in FIG. 5B or the Bluetooth option 507 "second device 220" shown in FIG. 5C. In response to the selection operation, the first device 210 may obtain the Bluetooth address of the second device 220 that corresponds to the Bluetooth option 503 "second device 220" or the Bluetooth option 507 "second device 220" shown in FIG. 5C.

S407. In response to the selection operation performed by the user on the first Bluetooth option, the first device 210 stores a correspondence between the tag ID and the Bluetooth address of the second device 220.

For example, in response to the foregoing selection operation, the first device 210 may store the correspondence between the tag ID and the Bluetooth address of the second device 220.

It should be noted that, in response to the selection operation performed by the user on the first Bluetooth option, the first device 210 may redisplay the first interface. For example, the mobile phone 210 may display the first interface 508 shown in FIG. 5A.

In some other embodiments, in response to the selection operation performed by the user on the first Bluetooth option, the first device 210 may not store the correspondence between the tag ID and the Bluetooth address of the second device 220, but transfers the Bluetooth address of the second device 220 to the electronic tag 221 of the second device 220 through the NFC chip 211. After receiving the Bluetooth address of the second device 220, the electronic tag 221 may store the Bluetooth address of the second device. In this way, when an NFC chip (for example, the NFC chip 211) of another device approaches the electronic tag 221 (that is, the distance between the NFC chip 211 and the electronic tag 221 is less than the preset threshold), the NFC chip 211 may directly obtain the Bluetooth address of the second device 220 from the electronic chip 221. That is, the first device 210 may perform the method shown in FIG. 3A-1 and FIG.

3A-2, to transfer a file to the second device 220. For example, when the electronic tag 221 is an active tag, the electronic tag 221 has relatively large storage space, and the electronic tag 221 may store data (for example, the Bluetooth address of the second device 220) transferred by the NFC chip 211.

If the first device 210 finds the Bluetooth address corresponding to the tag ID, the first device 210 may determine whether the first device 210 establishes a Bluetooth connection to a device (that is, the second device) corresponding to the found Bluetooth address. If the first device 210 does not find the Bluetooth address corresponding to the tag ID, after displaying the third interface, in response to the selection operation performed by the user on the first Bluetooth option, the first device 210 may obtain the Bluetooth address corresponding to the first Bluetooth option, and then determine whether the first device 210 establishes a Bluetooth connection to a device (that is, the second device) corresponding to the Bluetooth address of the first Bluetooth option. That is, the first device 210 may perform S408.

S408. The first device 210 determines whether the first device 210 establishes a Bluetooth connection to the second device 220 corresponding to the Bluetooth address.

Specifically, if the first device 210 has established a Bluetooth connection to the second device 220, the first device 210 may exchange a Wi-Fi connection parameter through the Bluetooth connection between the first device 210 and the second device 220, that is, perform S410. If the first device 210 has not established a Bluetooth connection to the second device 220, the first device 210 may establish a Bluetooth connection to the second device 220, and then exchange a Wi-Fi connection parameter through the Bluetooth connection, that is, perform S409 and S410.

Specifically, after the Bluetooth connection is established, the first device and the second device may maintain a Bluetooth persistent connection. For details, refer to related descriptions in the embodiment shown in FIG. 3A-1 and FIG. 3A-2.

S409. The first device 210 establishes a Bluetooth connection to the second device 220 based on the Bluetooth address of the second device 220.

S410. The first device 210 exchanges a Wi-Fi connection parameter with the second device 220 through the Bluetooth connection.

S411. The first device 210 establishes a Wi-Fi connection to the second device 220 based on the Wi-Fi connection parameter.

S412. After the Wi-Fi connection is established, the first device 210 automatically transfers the first file to the second device 220 through the Wi-Fi connection.

S410 is the same as S305. S411 is the same as S306. S412 is the same as S307.

The second device 220 may receive the first file sent by the first device 210 through the Wi-Fi connection. After receiving the first file sent by the first device 210, the second device 220 may automatically open the first file, and display the image information of the first file. For a method for displaying the image information of the first file by the second device 220 after receiving the first file, refer to the description in the embodiment of this application in FIG. 4A-1, FIG. 4A-2, and FIG. 4A-3. Details are not described in this embodiment of this application again.

Alternatively, after receiving the first file sent by the first device 210, the second device 220 may display the prompt information of the first file. The prompt information is used to indicate that the second device 220 receives the first file. The prompt information may be further used to determine whether to display the first file. For a method for displaying the prompt information of the first file by the second device 220 after receiving the first file, refer to the description in the embodiment of this application in FIG. 4B. Details are not described in this embodiment of this application again.

In an implementation, after S412, optionally, the method may further include the following steps S413 to S419.

S413. After the first file in S412 is transferred, the first device 210 disconnects the Wi-Fi connection to the second device 220, and maintains the Bluetooth connection to the second device 220.

S414. When the distance between the NFC chip of the first device 210 and the electronic tag 221 of the second device is less than the preset threshold again, that is, when the first device performs NFC contact with the second device again, the first device 210 obtains the tag ID in the electronic tag 221 again. When the first device performs NFC contact with the second device again, the first device displays a fifth interface. The fifth interface includes image information of a third file.

S415. The first device 210 searches for the Bluetooth address corresponding to the tag ID. For a specific process, refer to S403. Because the Bluetooth address corresponding to the tag ID has been stored, the Bluetooth address corresponding to the tag ID can be found in this step.

S416. The first device 210 determines that the first device 210 has established the Bluetooth connection to the second device 220 corresponding to the Bluetooth address.

S417. The first device 210 exchanges a Wi-Fi connection parameter with the second device 220 through the established Bluetooth connection, and establishes a new Wi-Fi connection based on the Wi-Fi connection parameter, that is, establishes a second Wi-Fi connection.

S418. After the Wi-Fi connection in S417 is established, the first device 210 automatically transfers the third file to the second device 220 through the Wi-Fi connection.

S419. After the third file in S418 is transferred, the first device 210 may disconnect the Wi-Fi connection to the second device 220, and maintain the Bluetooth connection to the second device 220, so that establishment of a Wi-Fi connection can be accelerated during transfer of another file.

S413 to S419 are not shown in FIG. 4C-1 and FIG. 4C-2. It should be noted that some content in S413 to S419 is similar to or the same as that in S308 to S313. For details, refer to the descriptions in S308 to S313.

According to the data transfer method provided in this embodiment of this application, when the first device displays the first interface corresponding to the first file, if the NFC chip 211 of the first device approaches the electronic tag 221 of the second device 220, the first device 210 may obtain the tag ID of the electronic tag 221. The first device 221 may search for the Bluetooth address corresponding to the tag ID. If the first device 210 finds the Bluetooth address corresponding to the tag ID, the first device 221 may establish the Bluetooth connection to the second device 220 based on the found Bluetooth address, or determine that the first device 221 has established the Bluetooth connection to the second device 220. If the first device 210 does not find the Bluetooth address corresponding to the tag ID, the first device 210 may also display the third interface. The user selects the Bluetooth address corresponding to the tag ID in the third interface, and then establishes the Bluetooth connection to the second device 220 based on the Bluetooth address selected by the user. Subsequently, the first device 210 may exchange the Wi-Fi connection parameter with the second device 220 through the Bluetooth connection, establish the Wi-Fi connection, and transfer the first file to the second device 221 through the Wi-Fi connection.

The second device 220 does not need to be provided with an NFC chip, and costs of configuring the electronic tag are relatively low. Therefore, in this embodiment of this application, a file can be transferred through NFC contact without increasing hardware costs. In addition, as long as the NFC chip 211 approaches the electronic tag 221, the user can transfer, to the second device 220, the first file corresponding to the first interface currently displayed by the first device, thereby simplifying user operations.

Further, exchanging the Wi-Fi connection parameter through the Bluetooth connection can increase a speed of establishing the Wi-Fi connection, and improve file transfer efficiency. In addition, transferring the first file through the Wi-Fi connection can increase a file transfer rate.

Moreover, the Bluetooth persistent connection may be maintained between the first device and the second device. Therefore, when the NFC chip of the first device contacts the electronic tag of the second device, the Wi-Fi connection may be quickly established through the established Bluetooth connection, thereby further improving file transfer efficiency.

Figures 1, 6A:
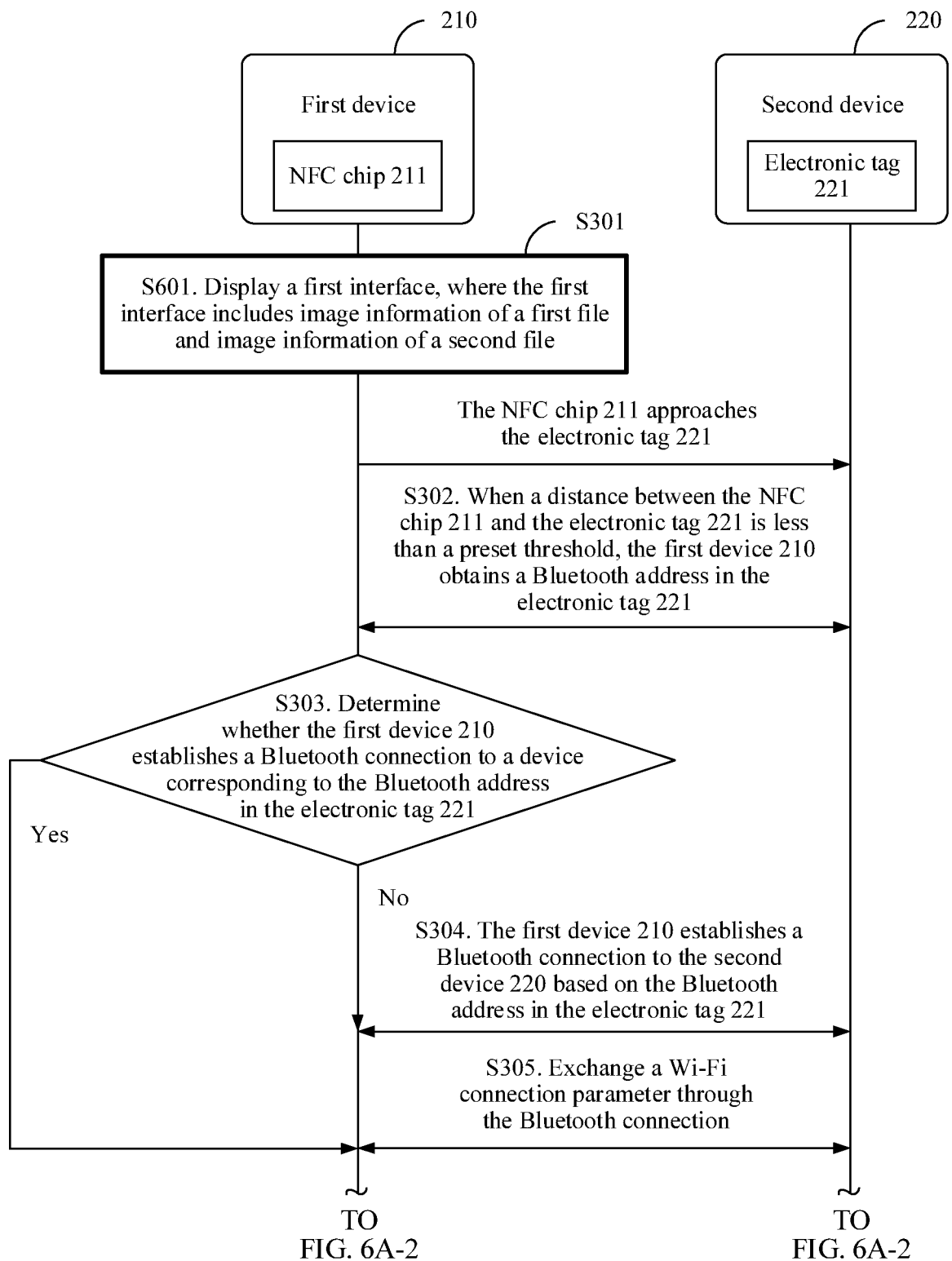
Figures 2, 6A:
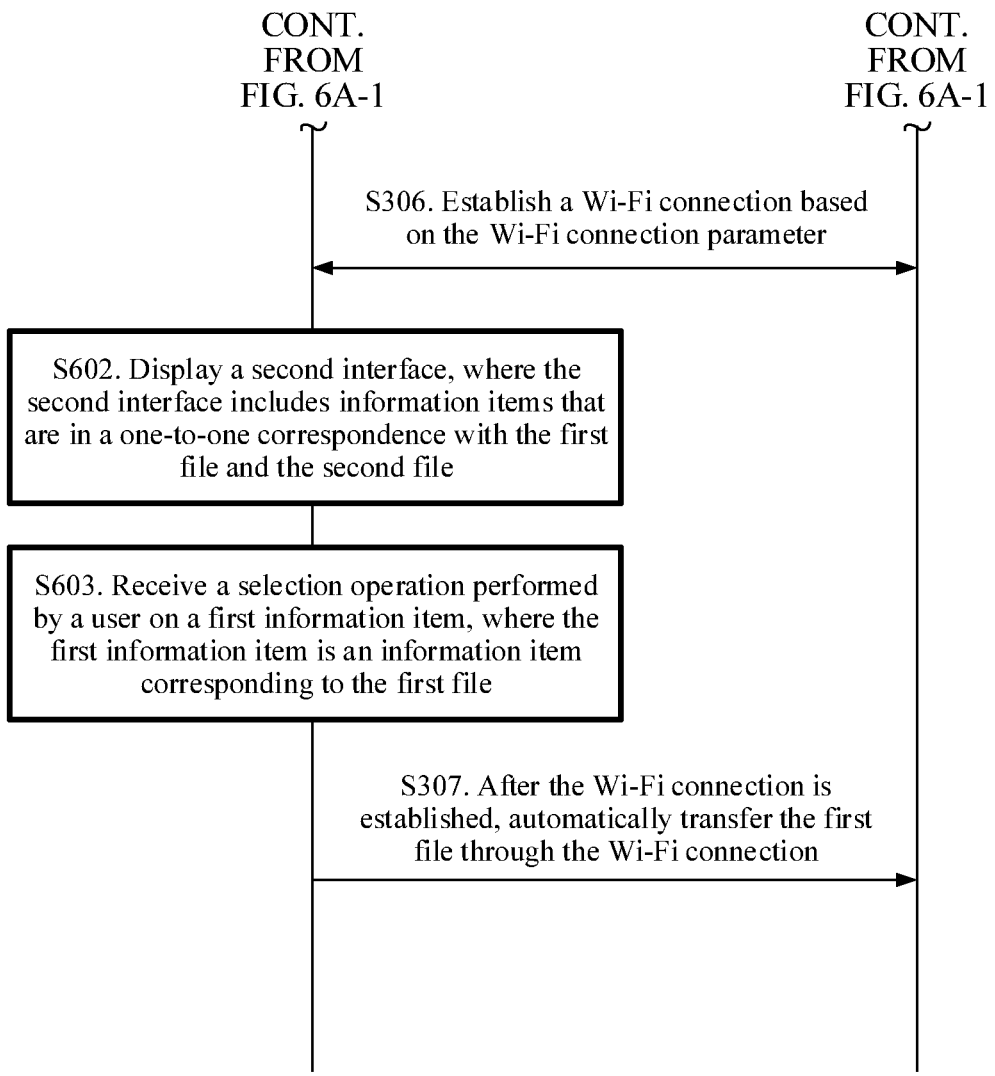
Figures 1, 6B:
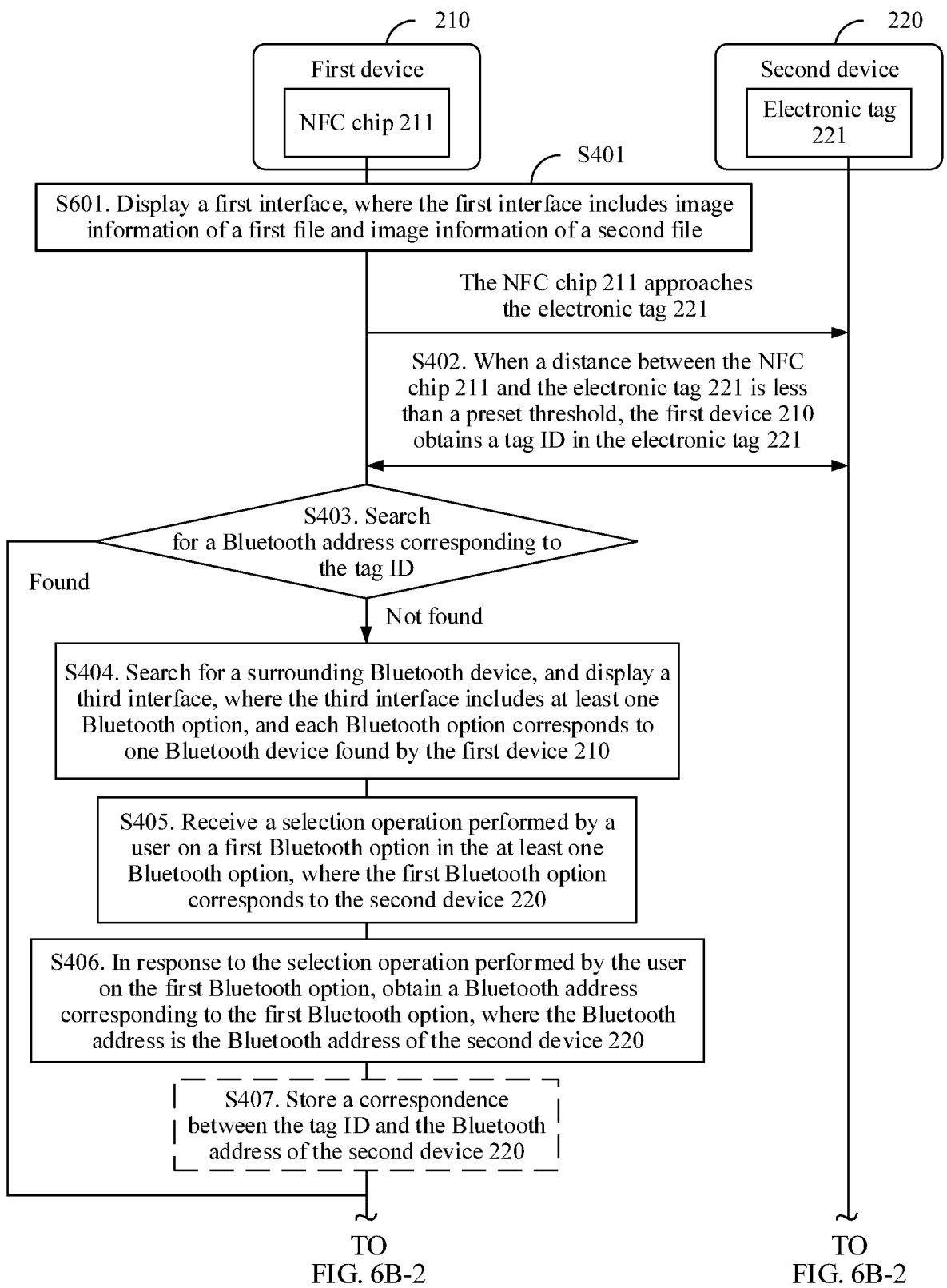
Figures 2, 6B:
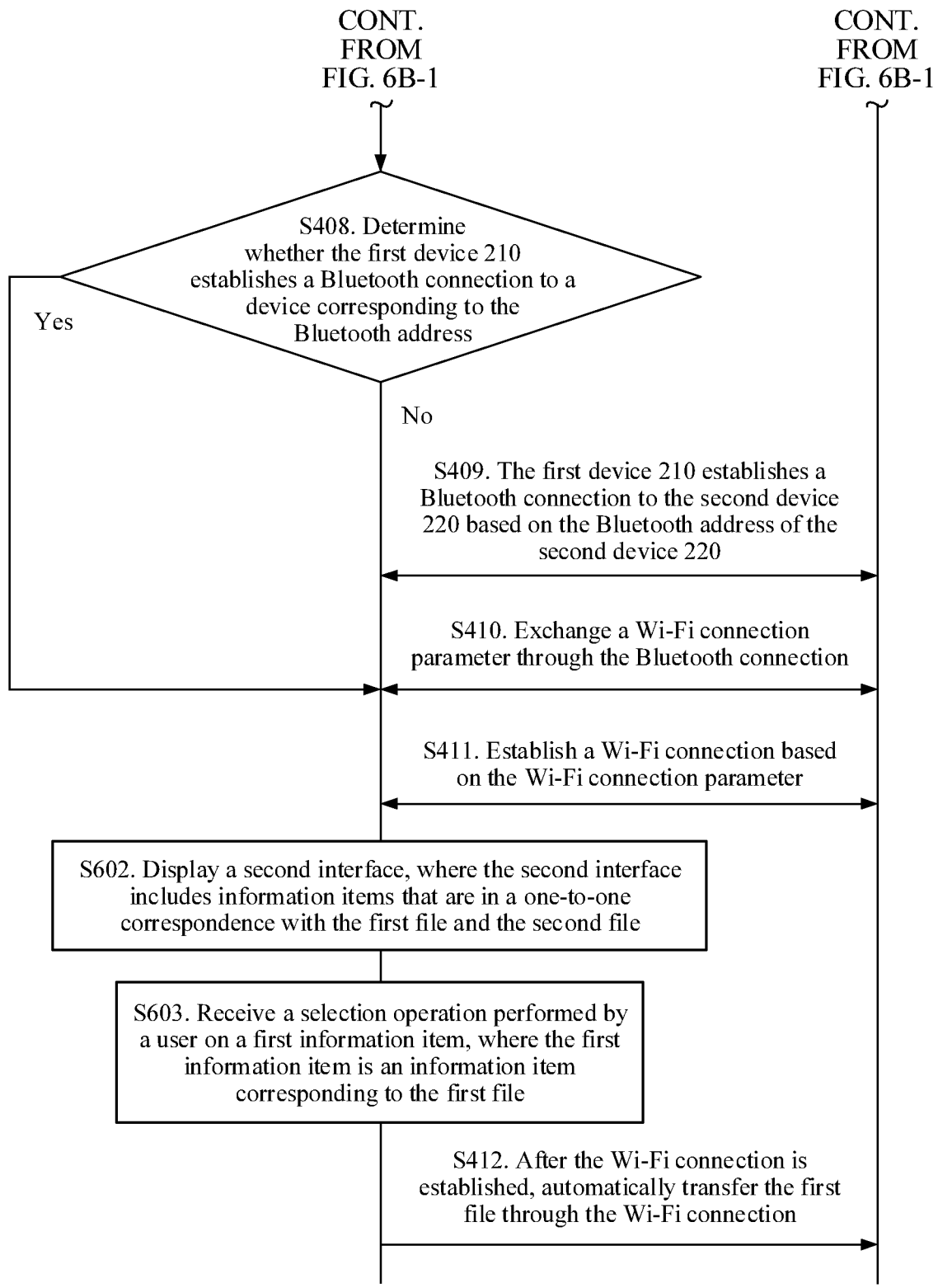

In some embodiments, the first interface may include image information of a plurality of files. The first file is one of the plurality of files. For example, the first interface may further include image information of a second file. In this case, before the first device 210 transfers the first file to the second device 220 through the Wi-Fi connection, the user may select the first file from the first interface. Specifically, before S307 or S412, the method in this embodiment of this application may further include S601 and S602. For example, as shown in FIG. 6A-1 and FIG. 6A-2, S301 in FIG. 3A-1 and FIG. 3A-2 may be replaced with S601. Before S307 shown in FIG. 3A-1 and FIG. 3A-2, the method in this embodiment of this application may further include S602 and S603. As shown in FIG. 6B-1 and FIG. 6B-2, S301 in FIG. 4C-1 and FIG. 4C-2 may be replaced with S601. Before S412 shown in FIG. 4C-1 and FIG. 4C-2, the method in this embodiment of this application may further include S602 and S603.

S601. The first device 210 displays a first interface, where the first interface includes image information of a first file and image information of a second file.

S602. The first device 210 displays a second interface, where the second interface includes information items that are in a one-to-one correspondence with the first file and the second file.

Figure 7A:
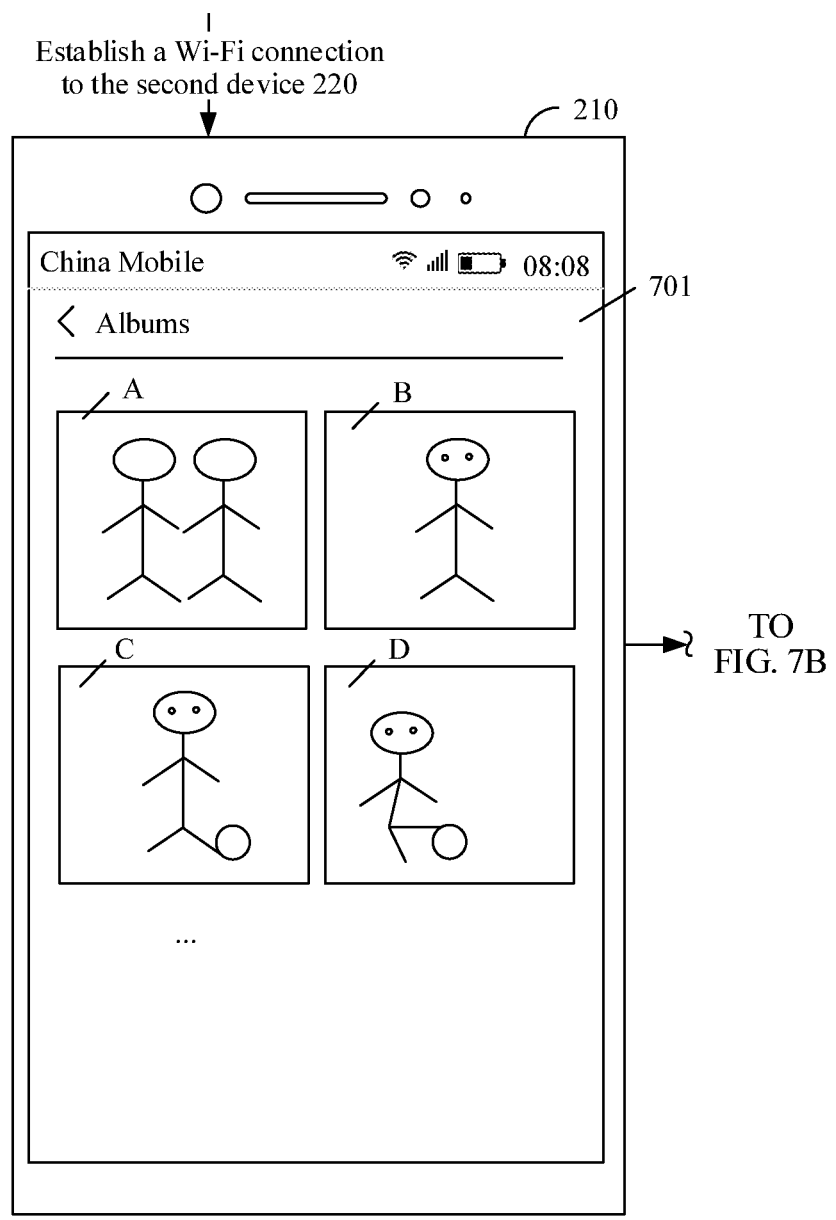
FIG. 7A, FIG. 7B, and FIG. 7C are a schematic diagram 5 of an instance of a display interface of an electronic device according to an embodiment of this application.
Figure 7B:
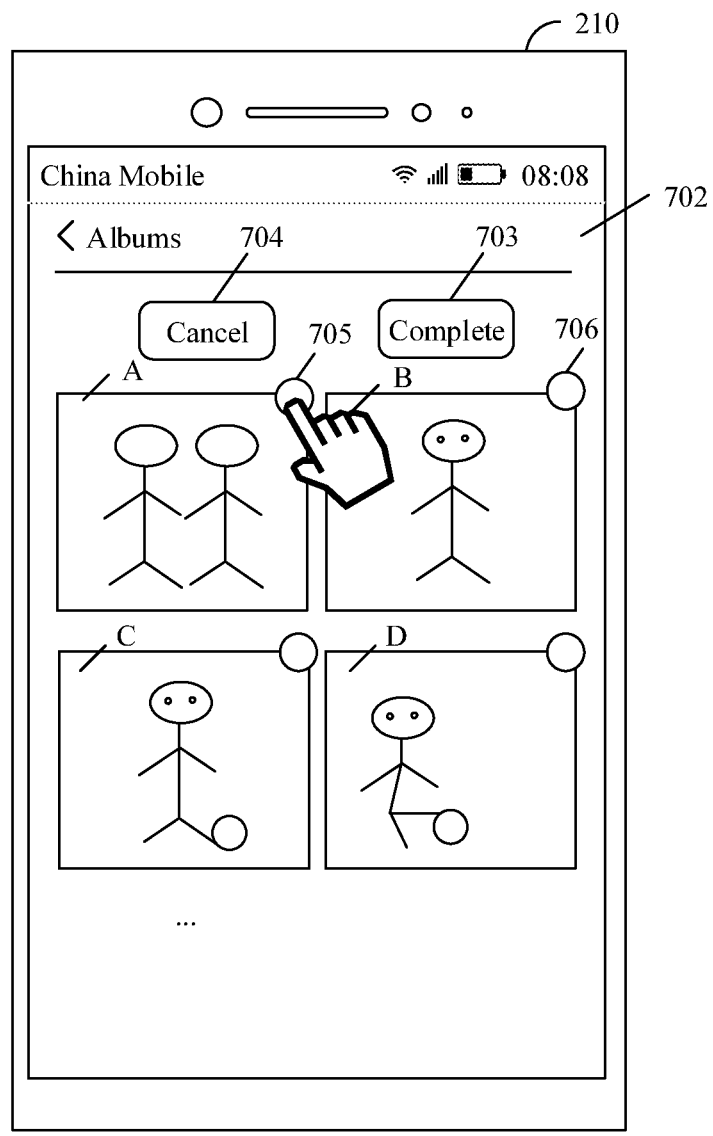
Figure 7C:
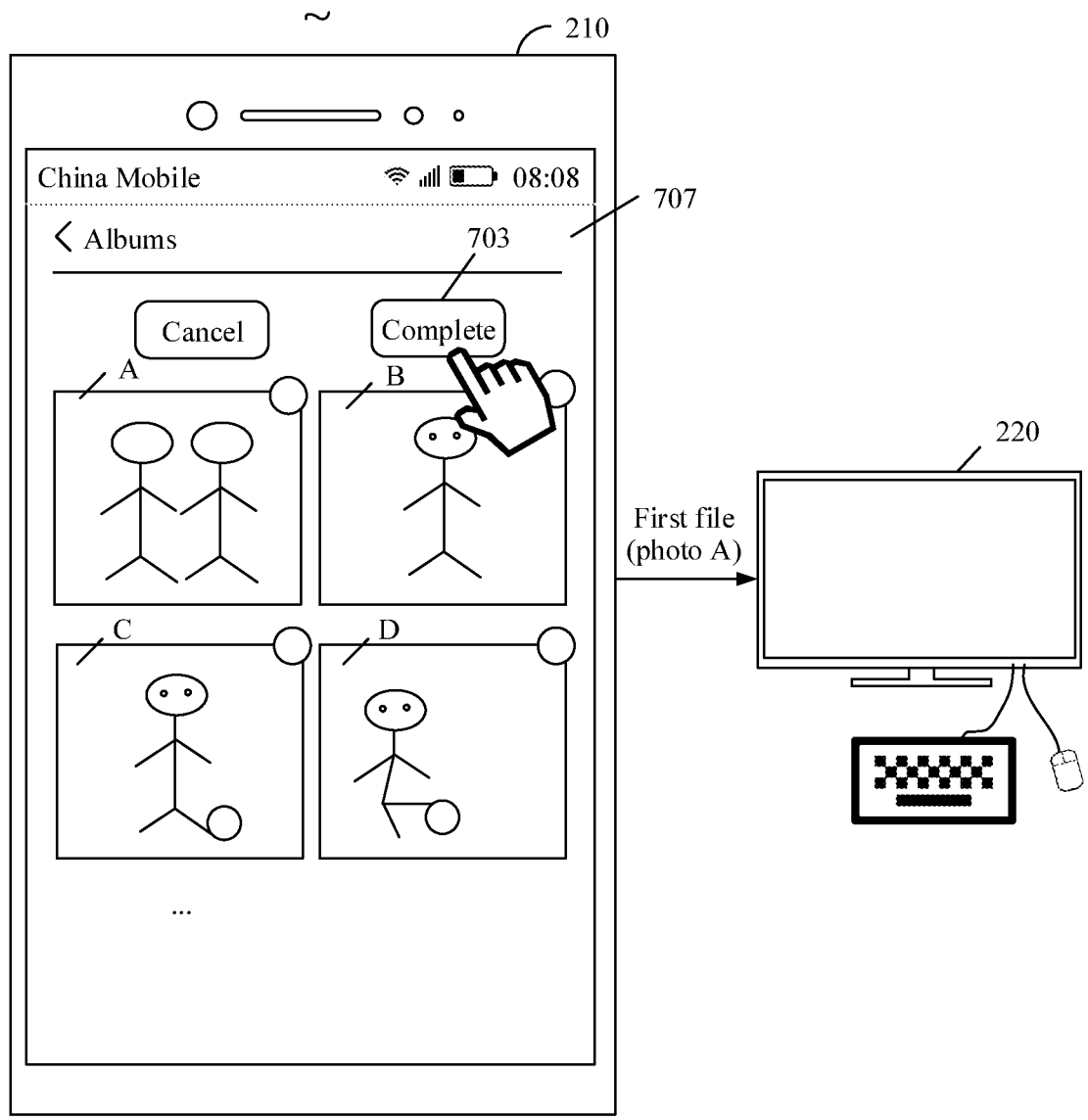

For example, it is assumed that the first device 210 is a mobile phone 210 shown in FIG. 7A, FIG. 7B, and FIG. 7C. The first interface is a display interface of a plurality of photos. The mobile phone 210 may display a first interface 701 shown in FIG. 7A. The first interface 701 includes a plurality of photos. For example, the first interface 701 includes a photo A, a photo B, a photo C, and a photo D. In response to establishing a Wi-Fi connection to the second device 220 by the mobile phone 210, the mobile phone 210 may display a second interface 702 shown in FIG. 7B. The second interface 702 includes an information item 705 of the photo A, an information item 706 of the photo B, an information item of the photo C, and an information item of the photo D. The second interface 702 may further include a "cancel" button 704 and a "complete" button 705.

S603. The first device 210 receives a selection operation performed by a user on a first information item, where the first information item is an information item corresponding to the first file.

With reference to the foregoing example, the mobile phone 210 may receive a tap operation (for example, a single tap operation) performed by the user on at least one of the information item 705 of the photo A, the information item 706 of the photo B, the information item of the photo C, and the information item (that is, the first information item) of the photo D in the second interface 702. For example, it is assumed that the photo A is the first file, and the photo B, the photo C, and the photo D are the second file. As shown in FIG. 7B, the mobile phone 210 may receive a tap operation performed by the user on the information item 705 (that is, the first information item) of the photo A. In response to the tap operation performed by the user on the information item 705 of the photo A, a second interface 707 shown in FIG. 7C may be displayed. In the second interface 707, the information item 705 of the photo A is selected. The mobile phone 210 may receive a tap operation (for example, a single tap operation) performed by the user on the "complete" button 705 shown in FIG. 7C. In response to the tap operation performed by the user on the "complete" button 705 shown in FIG. 7C, the mobile phone 210 may automatically send the photo A (that is, the first file) to the second device 220 through the Wi-Fi connection to the second device 220. After the mobile phone 210 sends the photo A to the second device 220, the mobile phone 210 may redisplay the first interface 701 shown in FIG. 7A.

If the mobile phone 210 receives a tap operation (for example, a single tap operation) performed by the user on the "cancel" button 704, the mobile phone 210 may redisplay the first interface 701 shown in FIG. 7A.

For example, when the first interface is a recommendation interface of a plurality of videos, the first interface includes recommendation items of the plurality of videos. In response to establishing a Wi-Fi connection to the second device 220 by the mobile phone 210, the mobile phone 210 may display the second interface. The second interface 702 includes a plurality of recommendation items (that is, information items) for selection by the user. In response to a selection operation performed by the user on at least one (that is, the first information item) of the plurality of information items, the mobile phone 210 sends, to the second device 220 through the Wi-Fi connection to the second device 220, video data or an identifier of a video (for example, a playing address of the video or a name of the video) that corresponds to the first information item, that is, the first file.

In some embodiments, the first device 210 may perform S602 and S603 after establishing the Wi-Fi connection to the second device 220. Alternatively, the first device 210 may perform S602 and S603 when the NFC chip 211 approaches the electronic tag 221. In these embodiments, after establishing the Wi-Fi connection, the first device 210 may automatically transfer, to the second device 220 through the Wi-Fi connection, the first file corresponding to the first information item selected by the user in S603.

In some other embodiments, after displaying the first interface (that is, performing S601), the first device 210 may receive a preset operation performed by the user on the first interface. In response to the preset operation, the first device 210 may perform S602 and S603. When the first device 210 performs S602 and S603, the first device 210 may perform S302 to S306. Alternatively, after the first device 210 performs S602 and S603, the first device 210 may perform S302 to S306. After establishing the Wi-Fi connection, the first device 210 may automatically transfer, to the second device 220 through the Wi-Fi connection, the first file corresponding to the first information item selected by the user in S603.

In some other embodiments, after displaying the first interface (that is, performing S601), the first device 210 may receive a preset operation performed by the user on the first interface. In response to the preset operation, the first device 210 may perform S602 and S603. In this embodiment, the first device 210 may perform S402 to S411 after S602 and S603.

Alternatively, when the first device 210 performs S602 and S603, the first device 210 may perform S402 and S403. After S403, if the first device 210 finds the Bluetooth address corresponding to the tag ID, the first device 210 may continue to perform 408 to S411. After S403, if the first device 210 finds the Bluetooth address corresponding to the tag ID, the first device 210 may continue to perform 408 to S411. After S403, if the first device 210 does not find the Bluetooth address corresponding to the tag ID, the first device 210 may display a third interface after the user selects the first file in the second interface. Specifically, the first device 210 does not find the Bluetooth address corresponding to the tag ID, and the first device 210 may perform S404 to S411 after S602 and S603. After establishing the Wi-Fi connection, the first device 210 may automatically transfer, to the second device 220 through the Wi-Fi connection, the first file corresponding to the first information item selected by the user in S603.

Figure 8A:
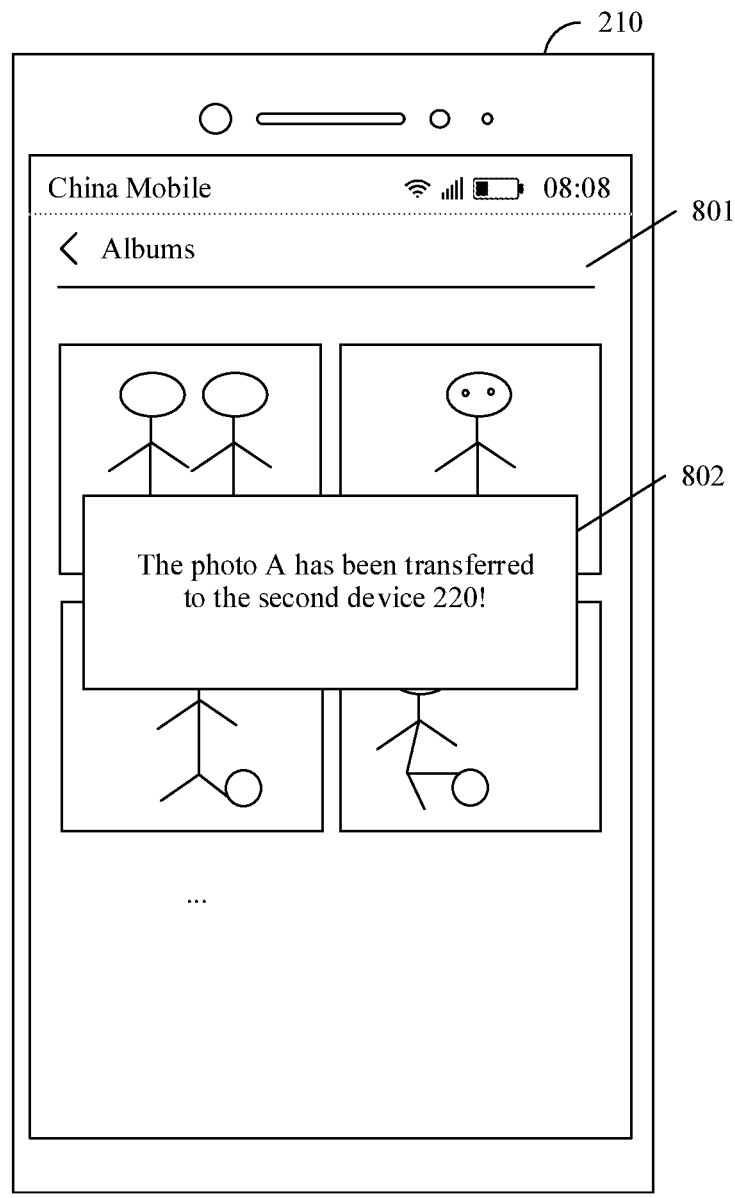
FIG. 8A is a schematic diagram 6 of an instance of a display interface of an electronic device according to an embodiment of this application.

Optionally, after the first device 210 automatically sends the first file to the second device 220 through the Wi-Fi connection, the first device 210 may display a fourth interface. The fourth interface is used to prompt that the first file has been transferred to the second device 220. For example, as shown in FIG. 7C, after the mobile phone 210 sends the photo A to the second device 220, the mobile phone 210 may display a fourth interface 801 shown in FIG. 8A. The fourth interface 801 includes prompt information 802 "The photo A has been transferred to the second device 220!".

In this embodiment of this application, when the first interface is an interface corresponding to a plurality of files, before sending a file to the second device 220, the first device 210 may display the second interface used by the user to select a to-be-sent file. In this way, the first device 210 may send a file to the second device 220 based on selection of the user in the second interface and an intention of the user, thereby improving user experience during data transfer between the first device 210 and the second device 220.

Certainly, when the first interface is an interface corresponding to a plurality of files, the first device 210 may alternatively not display the second interface, but directly sends the plurality of files (for example, the first file and the second file) corresponding to the first interface to the second device 220. Alternatively, if the mobile phone 210 receives a tap operation (for example, a single tap operation) performed by the user on the "cancel" button 704, the mobile phone 210 may send the plurality of files corresponding to the first interface to the second device 220. In other words, the first device may not only automatically transfer the first file to the second device 220 through the Wi-Fi connection, but also automatically transfer the second file to the second device 220 through the Wi-Fi connection.

Figure 8B:
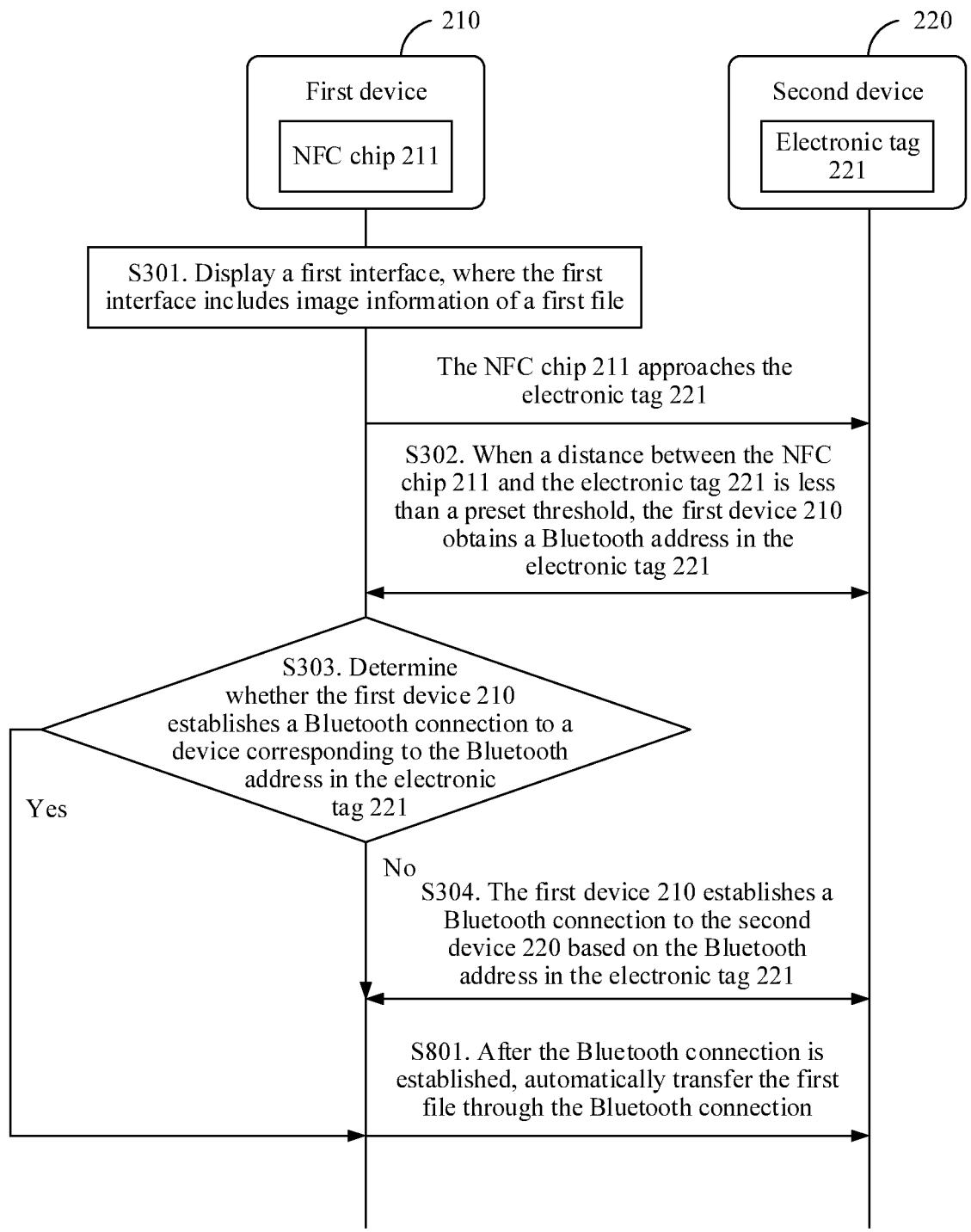
FIG. 8B is a flowchart 5 of a data transfer method according to an embodiment of this application.

In some embodiments, after establishing a Bluetooth connection to the second device 220, the first device 210 may directly transfer the first file through the Bluetooth connection. With reference to the foregoing first application scenario, an embodiment of this application provides a data transfer method. As shown in FIG. 8B, the data transfer method may include S301 to S304 and S801.

After S303, if the first device 210 has not established a Bluetooth connection to the second device 220, the first device 210 may perform S304 and S801. If the first device 210 has established a Bluetooth connection to the second device 220, the first device 210 may perform S801.

S801. After the Bluetooth connection is established, the first device 210 automatically transfers the first file to the second device 220 through the Bluetooth connection to the second device 220.

In this embodiment, if a Bluetooth persistent connection is maintained between the first device and the second device, after the first device and the second device perform NFC contact, a file may be directly transferred through the established Bluetooth connection, thereby improving transfer efficiency Optionally, after S801, the method may further include steps S802 to S806.

S802. After the first file in S801 is transferred, the first device 210 maintains the Bluetooth connection to the second device 220, that is, does not disconnect the Bluetooth connection.

S803. When the first device 210 and the second device 220 perform NFC contact again, the first device 210 obtains the Bluetooth address in the electronic tag 221 again. The first device currently displays a fifth interface including image information of a third file. S803 is the same as S309.

S804. The first device 210 determines that the first device 210 has established a Bluetooth connection to a device corresponding to the Bluetooth address in the electronic tag 221.

S805. The first device transfers the third file to the second device through the maintained Bluetooth connection.

S806. After the third file in S805 is transferred, the first device 210 still maintains the Bluetooth connection to the second device 220.

S802 to S806 are not shown in FIG. 8B.

Figure 9A:
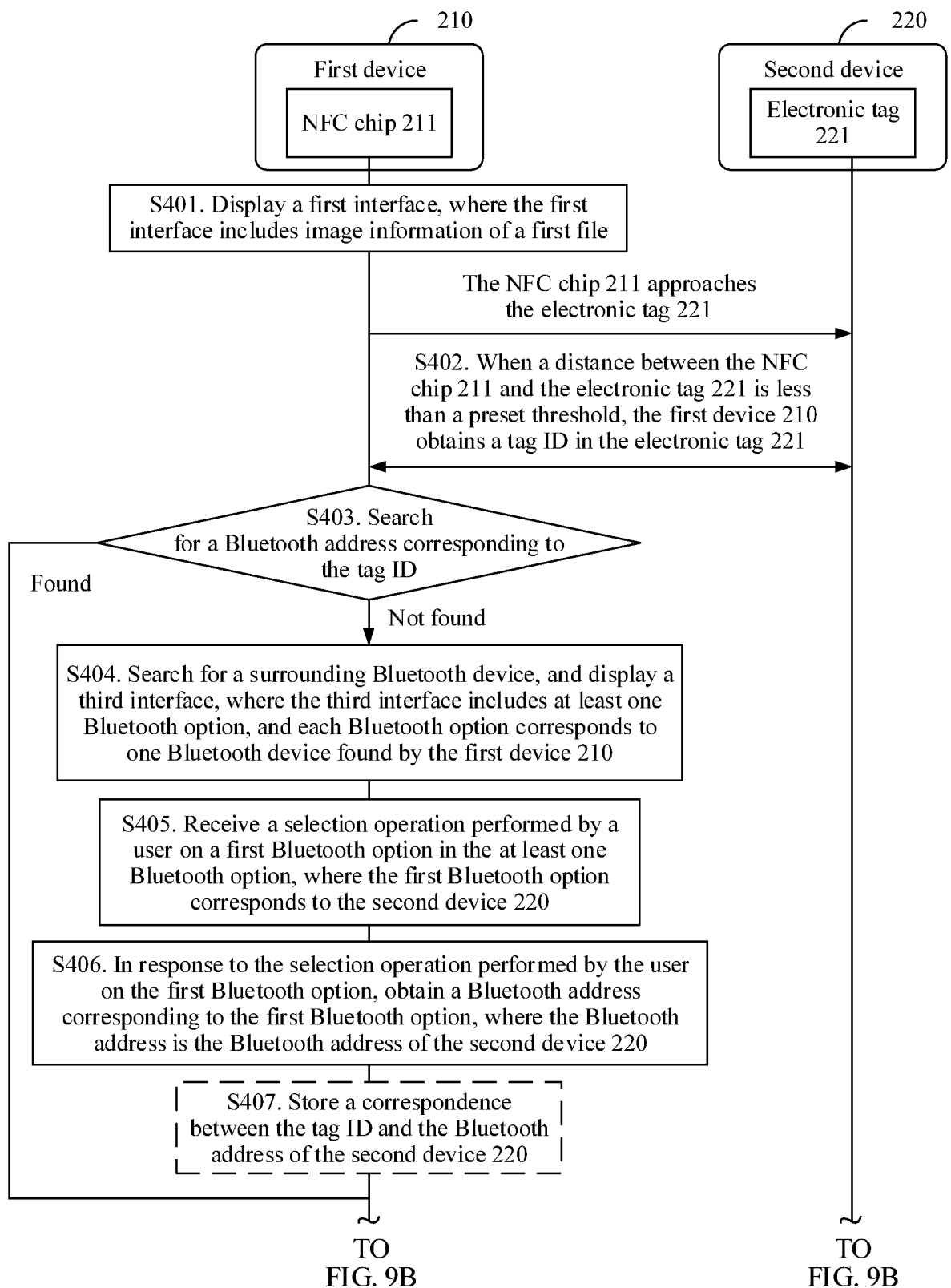
FIG. 9A and FIG. 9B are a flowchart 6 of a data transfer method according to an embodiment of this application.
Figure 9B:
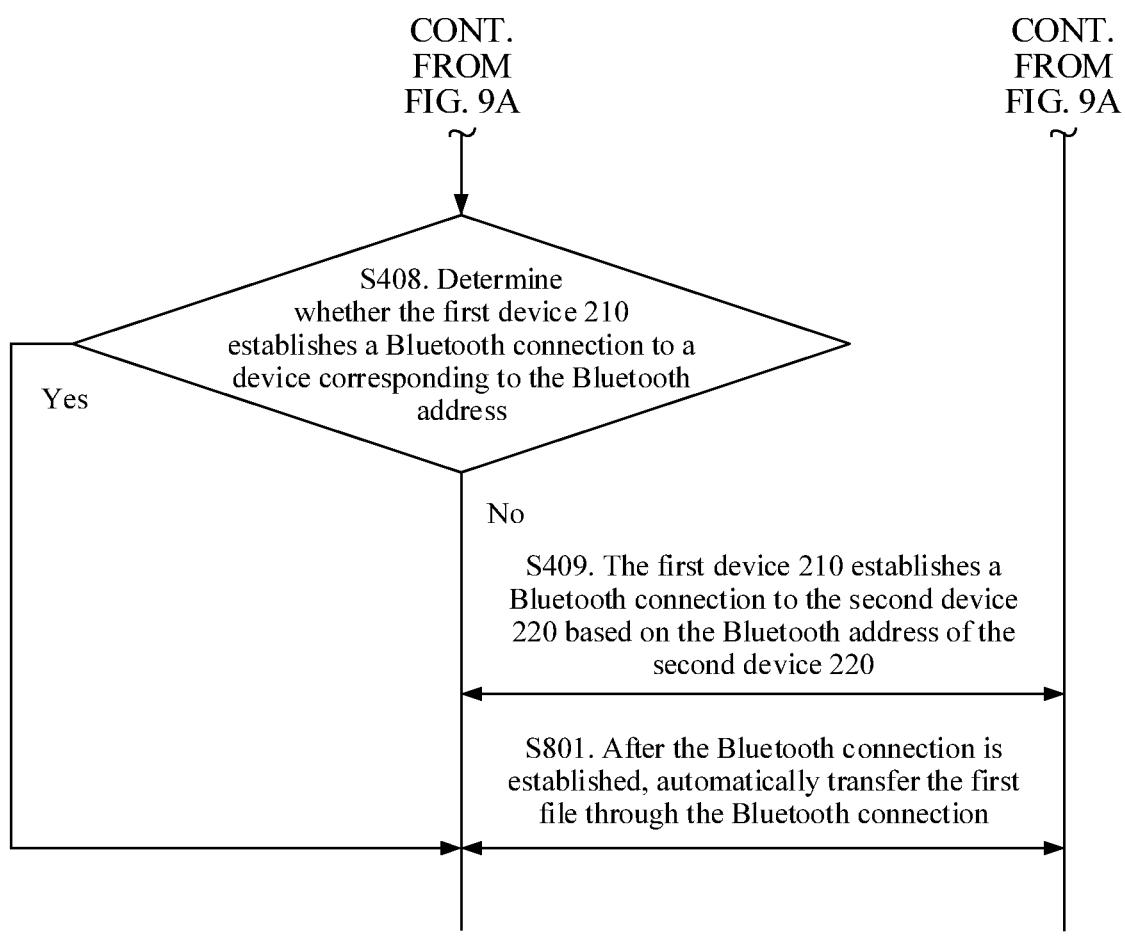

In some other embodiments, after establishing the Bluetooth connection to the second device 220, the first device 210 may directly transfer the first file through the Bluetooth connection. With reference to the foregoing second application scenario, an embodiment of this application provides a data transfer method. As shown in FIG. 9A and FIG. 9B, the data transfer method may include S401 to S409 and S801.

After S408, if the first device 210 has not established a Bluetooth connection to the second device 220, the first device 210 may perform S409 and S801. If the first device 210 has established a Bluetooth connection to the second device 220, the first device 210 may perform S801.

Optionally, after S801, the method may further include steps S810 to S815.

S810. After the first file in S801 is transferred, the first device 210 maintains the Bluetooth connection to the second device 220, that is, does not disconnect the Bluetooth connection. This step is the same as S802.

S811. When the first device 210 and the second device 220 perform NFC contact again, the first device 210 obtains the tag ID in the electronic tag 221 again. The first device currently displays a fifth interface including image information of a third file.

S812. The first device 210 searches for the Bluetooth address corresponding to the tag ID. For a specific process, refer to S403.

S813. The first device 210 determines that the first device 210 has established a Bluetooth connection to a device corresponding to the Bluetooth address in the electronic tag 221.

S814. The first device transfers the third file to the second device through the maintained Bluetooth connection.

S815. After the third file in S814 is transferred, the first device 210 still maintains the Bluetooth connection to the second device 220.

S810 to S815 are not shown in FIG. 9A and FIG. 9B.

According to the data transfer method provided in this embodiment of this application, when the first device displays the first interface corresponding to the first file, if the NFC chip 211 of the first device approaches the electronic tag 221 of the second device 220, the first device 210 may obtain the Bluetooth address of the second device 220. The first device 221 may establish the Bluetooth connection to the second device 220 corresponding to the Bluetooth address, and then transfer the first file to the second device 221 through the Bluetooth connection.

The second device 220 does not need to be provided with an NFC chip, and costs of configuring the electronic tag are relatively low. Therefore, in this embodiment of this application, a file can be transferred through NFC contact without increasing hardware costs. In addition, as long as the NFC chip 211 approaches the electronic tag 221, the user can transfer, to the second device 220, the first file corresponding to the first interface currently displayed by the first device, thereby simplifying user operations.

According to the data transfer method provided in this embodiment of this application, file transfer between two electronic devices (for example, a mobile phone and a PC) of a user can be implemented conveniently. For example, when an NFC chip of the mobile phone of the user approaches an electronic tag of the PC, the mobile phone may automatically obtain a Bluetooth address of the PC, and then the mobile phone and the PC may transfer a file through a communication connection (for example, a Bluetooth connection or a Wi-Fi connection) established based on the Bluetooth address. In this way, it is convenient for the user to perform an operation, and particularly, it is convenient for the user to transfer a file between the two devices of the user. In an implementation scenario in which a Bluetooth persistent connection is maintained between the two devices, after the mobile phone and the PC perform a Bluetooth connection for the first time, the Bluetooth connection between the mobile phone and the PC is maintained as long as Bluetooth functions of the mobile phone and the PC are enabled and a distance between the mobile phone and the PC can meet a Bluetooth connection requirement. Then, when the NFC chip of the mobile phone approaches the electronic tag of the PC, a Wi-Fi connection may be directly established through the Bluetooth connection, and a file may be transferred through the Wi-Fi connection, or a file may be directly transferred through the Bluetooth connection.

It may be understood that, to implement the foregoing functions, the electronic device (for example, the first device 210 or the second device 220) includes corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the electronic device may be divided into function modules based on the foregoing method examples. For example, each function module may be obtained through division based on each corresponding function, or two or more functions may be integrated into one processing module. The integrated module may be implemented in the form of hardware, or may be implemented in the form of a software function module. It should be noted that, in the embodiments of this application, module division is an example, and is merely a logical function division. In actual implementation, another division manner may be used.

Figure 10:
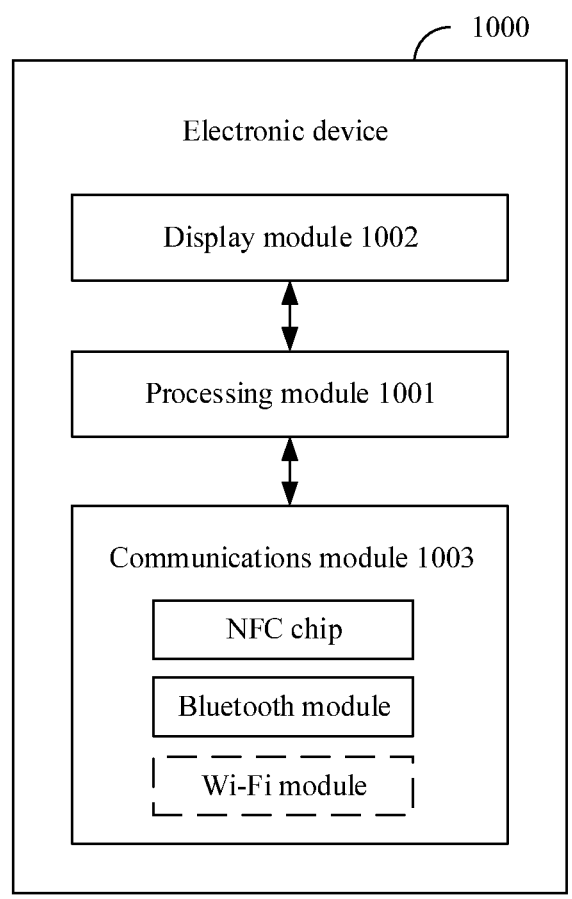
FIG. 10 is a schematic structural diagram of composition of an electronic device according to an embodiment of this application.

When an integrated unit is used, FIG. 10 is a possible schematic structural diagram of an electronic device 1000 in the foregoing embodiments. The electronic device 1000 may be the first device 210. The electronic device 1000 includes a processing module 1001, a display module 1002, and a communications module 1003. The communications module 1003 may include an NFC chip and a Bluetooth module. Optionally, the communications module 1003 may further include a Wi-Fi module.

The processing module 1001 is configured to control and manage an action of the electronic device 1000. The display module 1002 is configured to display an image generated by the processing module 1001. The communications module 1003 is configured to support the electronic device 1000 in communicating with another device.

Specifically, the processing module 1001 may be configured to support the electronic device 1000 in performing S302, S303, S305, S307 to S310, S312 and S313, S402, S403, S405, S406, S408, S410, S412 to S416, S418 and S419, S603, S801 to S806, and S810 to S815 in the foregoing method embodiments, and/or another process used for the technology described in this specification. The display module 1002 may be configured to support the electronic device 1000 in performing S301, S401, the operation of "displaying a third interface" in S404, S601, and S602 in the foregoing method embodiments, and/or another process used for the technology described in this specification. The NFC chip may be configured to: support the electronic device 1000 in performing the operation of "approaching the electronic tag 221" in S302 and S402 in the foregoing method embodiments, support the processing module 1001 in performing the operation of "obtaining a Bluetooth address in the electronic tag 221" in S302, and support the processing module 1001 in performing the operation of "obtaining the tag ID in the electronic tag 221" in S402, and/or another process used for the technology described in this specification. The Bluetooth module may be configured to support the electronic device 1000 in performing the operation of "searching for a Bluetooth device" in S304 and S404, and S409 in the foregoing method embodiments, and/or another process used for the technology described in this specification. The Wi-Fi module may be configured to support the electronic device 1000 in performing S306, S311, S411 and S417 in the foregoing method embodiments, and/or another process used for the technology described in this specification.

Certainly, the unit modules in the electronic device 1000 include but are not limited to the processing module 1001, the display module 1002, and the communications module 1003. For example, the electronic device 1000 may further include a storage module. The storage module is configured to store program code and data of the electronic device 1000. In addition, the storage module may be further configured to support the electronic device 1000 in performing S407 in the foregoing method embodiment, and/or another process used for the technology described in this specification.

The processing module 1001 may be a processor or a controller, for example, may be a central processing unit (Central Processing Unit, CPU), a digital signal processor (Digital Signal Processing, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may include an application processor and a baseband processor. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor. The storage module may be a memory.

For example, the processing module 1001 is one or more processors (the processor 110 shown in FIG. 1). The communications module 1003 includes a wireless communications module (the wireless communications module 160 shown in FIG. 1, where the wireless communications module 160 includes BT (that is, a Bluetooth module), a WLAN (for example, a Wi-Fi module), and NFC (that is, an NFC chip)). The wireless communications module may be referred to as a communications interface. The storage module may be a memory (the internal memory 121 shown in FIG. 1). The display module 1002 may be a touchscreen (the display 194 shown in FIG. 1, where the display 194 integrates a display panel and a touch panel). The electronic device 1000 provided in this embodiment of this application may be the electronic device 100 shown in FIG. 1. The one or more processors, the memory, the communications interface, the touchscreen, and the like may be connected together, for example, by using a bus.

An embodiment of this application further provides a computer storage medium. The computer storage medium stores computer program code, and when the foregoing processor executes the computer program code, the electronic device 1000 performs related method steps in any one of FIG. 3A-1 and FIG. 3A-2, FIG. 4C-1 and FIG. 4C-2, FIG. 6A-1 and FIG. 6A-2, FIG. 6B-1 and FIG. 6B-2, FIG. 8B, and FIG. 9A and FIG. 9B to implement the method in the foregoing embodiments.

An embodiment of this application further provides a computer program product. When the computer program product is run on a computer, the computer is enabled to perform related method steps in any one of FIG. 3A-1 and FIG. 3A-2, FIG. 4C-1 and FIG. 4C-2, FIG. 6A-1 and FIG. 6A-2, FIG. 6B-1 and FIG. 6B-2, FIG. 8B, and FIG. 9A and FIG. 9B to implement the method in the foregoing embodiments.

The electronic device 1000, the computer storage medium, and the computer program product provided in the embodiments of this application each are configured to perform the corresponding method provided above. Therefore, for beneficial effects that can be achieved by the electronic device 1000, the computer storage medium, and the computer program product, refer to the beneficial effects in the corresponding method provided above. Details are not described herein again.

The foregoing descriptions about implementations allow a person skilled in the art to understand that, for the purpose of convenient and brief description, division into the foregoing function modules is used as an example for description. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, function units in the embodiments of this application may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a first device, wherein the method comprises:
   displaying a first interface comprising first image information of a first file;
   obtaining a BLUETOOTH address of a second device when a distance between a Near-Field Communication (NFC) chip of the first device and an electronic tag of the second device is less than a preset threshold, wherein the electronic tag comprises device information of the second device, and wherein the device information comprises the BLUETOOTH address or a tag identifier (ID) to obtain the BLUETOOTH address;
   exchanging a WI-FI connection parameter with the second device through a BLUETOOTH connection corresponding to the BLUETOOTH address;
   establishing a first WI-FI connection to the second device using the WI-FI connection parameter;

transferring the first file to the second device through the first WI-FI connection in response to establishing the first WI-FI connection;
disconnecting the first WI-FI connection after transferring the first file; and
maintaining the BLUETOOTH connection to the second device.

2. The method of claim 1, wherein the first interface further comprises second image information of a second file, and wherein before transferring the first file to the second device, the method further comprises:
displaying a second interface comprising information items that are in a one-to-one correspondence with the first file and the second file; and
receiving a selection operation from a user on a first information item, wherein the first information item corresponds to the first file.

3. The method of claim 1, wherein the first interface further comprises second image information of a second file, and wherein the method further comprises transferring the second file to the second device through the first WI-FI connection.

4. The method of claim 1, wherein the device information comprises the BLUETOOTH address, and wherein the method further comprises obtaining the BLUETOOTH address from the electronic tag.

5. The method of claim 1, wherein the device information comprises the tag ID, and wherein the method further comprises:
obtaining the tag ID from the electronic tag;
searching for the BLUETOOTH address corresponding to the tag ID; and
when the BLUETOOTH address is not found:
searching for a surrounding BLUETOOTH device;
displaying a third interface comprising a BLUETOOTH option corresponding to the surrounding BLUETOOTH device, wherein the surrounding BLUETOOTH device is the second device;
receiving a selection operation from a user on the BLUETOOTH option; and
obtaining, in response to the selection operation and based on the BLUETOOTH option, the BLUETOOTH address.

6. The method of claim 5, further comprising storing, in response to the selection operation, a correspondence between the tag ID and the BLUETOOTH address.

7. The method of claim 5, further comprising:
storing the tag ID and the BLUETOOTH address in a memory of the first device; and
obtaining the BLUETOOTH address from the memory.

8. The method of claim 5, further comprising transferring, in response to the selection operation, the BLUETOOTH address to the electronic tag through the NFC chip.

9. The method of claim 1, wherein the first interface is:
a plurality of first pictures, wherein the first file is a second picture in the first pictures;
a home screen of the first device, wherein the first file is a screenshot of the home screen;
a video playing interface, wherein the first file is a video file that is being played by the first device or address information of the video file;
a browser page of the first device, wherein the first file is a page address or a screenshot of the browser page; or
image information of a first document opened by the first device, wherein the first file is a second document currently opened by the first device.

10. The method of claim 1, wherein after disconnecting the first WI-FI connection and maintaining the BLUETOOTH connection, the method further comprises:
re-exchanging the WI-FI connection parameter with the second device through the BLUETOOTH connection;
establishing a second WI-FI connection to the second device; and
transferring a third file to the second device through the second WI-FI connection.

11. The method of claim 1, wherein the BLUETOOTH connection corresponding to the BLUETOOTH address is a BLUETOOTH persistent connection that is maintained after establishing the BLUETOOTH connection between the first device and the second device for the first time.

12. A first device comprising:
a Near-Field Communication (NFC) chip;
a display configured to display a first interface comprising first image information of a first file;
one or more processors coupled to the NFC chip and the display and configured to obtain, using the NFC chip, a BLUETOOTH address of a second device when a distance between the NFC chip and an electronic tag of the second device is less than a preset threshold, wherein the electronic tag comprises device information of the second device, and wherein the device information comprises the BLUETOOTH address or a tag identifier (ID) to obtain the BLUETOOTH address;
a BLUETOOTH system coupled to the one or more processors and configured to establish a BLUETOOTH connection to the second device based on the BLUETOOTH address,
wherein the one or more processors are further configured to exchange, using the BLUETOOTH connection, a WI-FI connection parameter with the second device; and
a WI-FI system coupled to the one or more processors and configured to establish, based on the WI-FI connection parameter, a first WI-FI connection to the second device, and wherein the one or more processors are further configured to:
transfer, using the first WI-FI connection, the first file to the second device in response to establishing the first WI-FI connection;
disconnect the first WI-FI connection after transferring the first file; and
maintain the BLUETOOTH connection to the second device.

13. The first device of claim 12, wherein the first interface further comprises second image information of a second file, wherein the display is further configured to display a second interface comprising information items that are in a one-to-one correspondence with the first file and the second file before transferring the first file to the second device, wherein the one or more processors are further configured to receive a selection operation from a user on a first information item of the information items, and wherein the first information item corresponds to the first file.

14. The first device of claim 12, wherein the first interface further comprises second image information of a second file, and wherein the one or more processors are further configured to transfer the second file to the second device through the first WI-FI connection.

15. The first device of claim 12, wherein the device information comprises the BLUETOOTH address, and wherein the one or more processors are further configured to obtain, using the NFC chip, the BLUETOOTH address from the electronic tag.

16. The first device of claim 12, wherein the device information comprises the tag ID, wherein the one or more processors are further configured to:
- obtain, using the NFC chip, the tag ID from the electronic tag;
- search for the BLUETOOTH address corresponding to the tag ID; and
- when the BLUETOOTH address is not found:
  - search, using the BLUETOOTH system, for a surrounding BLUETOOTH device;
  - display, using the display, a third interface comprising a BLUETOOTH option, wherein the BLUETOOTH option corresponds to the surrounding BLUETOOTH device, and wherein the surrounding BLUETOOTH device is the second device;
  - receive a selection operation from a user on the BLUETOOTH option; and
  - obtain, in response to the selection operation and based on the BLUETOOTH option, the BLUETOOTH address.

17. The first device of claim 16, wherein the one or more processors are further configured to store, in response to the selection operation, a correspondence between the tag ID and the BLUETOOTH address.

18. The first device of claim 16, wherein the one or more processors are further configured to:
- store the tag ID and the BLUETOOTH address to a memory; and
- obtain the BLUETOOTH address from the memory.

19. The first device of claim 16, wherein the one or more processors are further configured to transfer, in response to the selection operation and using the NFC chip, the BLUETOOTH address to the electronic tag.

20. A computer program product comprising instructions stored on a non-transitory computer-readable medium that, when executed by one or more processors, cause a first device to:
- display a first interface comprising first image information of a first file;
- obtain a BLUETOOTH address of a second device when a distance between a Near-Field Communication (NFC) chip of the first device and an electronic tag of the second device is less than a preset threshold, wherein the electronic tag comprises device information of the second device, and wherein the device information comprises the BLUETOOTH address or a tag identifier (ID) to obtain the BLUETOOTH address;
- exchange a WI-FI connection parameter with the second device through a BLUETOOTH connection corresponding to the BLUETOOTH address;
- establish a first WI-FI connection to the second device using the WI-FI connection parameter;
- transfer the first file to the second device through the first WI-FI connection in response to establishing the first WI-FI connection;
- disconnect the first WI-FI connection after transferring the first file; and
- maintain the BLUETOOTH connection to the second device.

* * * * *